United States Patent [19]

Itabashi et al.

[11] Patent Number: 5,504,613
[45] Date of Patent: Apr. 2, 1996

[54] OPTICAL SCANNER

[75] Inventors: Akihisa Itabashi, Mitaka; Hiromichi Atsuumi, Yokohama, both of Japan

[73] Assignee: Ricoh Company, Ltd., Tokyo, Japan

[21] Appl. No.: 131,306

[22] Filed: Oct. 4, 1993

[30] Foreign Application Priority Data

Oct. 9, 1992 [JP] Japan .................................... 4-271664

[51] Int. Cl.⁶ .................................................. G02B 26/08
[52] U.S. Cl. .......................... 359/210; 359/208; 359/214; 359/216
[58] Field of Search ............................ 359/210, 216–219, 359/813, 819, 820, 822, 205–208, 212–215, 221; 358/296, 474, 494; 347/256–261

[56] References Cited

U.S. PATENT DOCUMENTS

| | | | |
|---|---|---|---|
| 4,379,612 | 4/1983 | Matsuoka et al. | 359/205 |
| 4,852,957 | 8/1989 | Wakimoto et al. | 359/208 |
| 4,984,858 | 1/1991 | Kuroda | 359/208 |
| 5,015,050 | 5/1991 | Itabashi | 359/206 |
| 5,029,956 | 7/1991 | Takanashi et al. | 250/236 |
| 5,031,979 | 7/1991 | Itabashi | 359/206 |
| 5,062,679 | 11/1991 | Itabashi | 359/206 |
| 5,064,261 | 11/1991 | Itabashi | 359/206 |
| 5,162,938 | 11/1992 | Iima et al. | 359/207 |
| 5,220,449 | 6/1993 | Kuroda | 359/208 |
| 5,221,986 | 6/1993 | Itabashi | 359/206 |
| 5,233,454 | 8/1993 | Sakuma et al. | 359/196 |

FOREIGN PATENT DOCUMENTS

| | | | |
|---|---|---|---|
| 61-67818 | 4/1986 | Japan | 359/218 |
| 62-275216 | 11/1987 | Japan | 359/208 |
| 63-65417 | 3/1988 | Japan | 359/217 |
| 2-15231 | 1/1990 | Japan | 359/208 |

OTHER PUBLICATIONS

Matsuda et al. "Laser printer scanning system with a parabolic mirror", Applied Optics/vol. 17, No. 6, Mar. 15, 1978, pp. 878–884.

*Primary Examiner*—James Phan
*Attorney, Agent, or Firm*—Oblon, Spivak, McClelland, Maier & Neustadt

[57] ABSTRACT

In an optical scanner, a light beam from a light source device is formed by a linear image forming optical system as a linear image extending in a main scan-corresponding direction. The light beam is then deflected by an optical deflector at an equal angular velocity and is converged by an image forming reflecting mirror as a light spot on a scanned face. An optical scanning operation is performed at an equal speed by using this light spot. An error in an image forming position in a cross scan-corresponding direction caused by an error in arrangement of an optical system is corrected by displacing and adjusting an arranging position of the linear image forming optical system in the cross scan-corresponding direction. In the optical scanner using the image forming reflecting mirror, a curve ill a scanning line caused by the error in arrangement of the optical system can be effectively corrected and reduced.

9 Claims, 17 Drawing Sheets

FIELD CURVATURE    SCANNING CHARACTERISTICS(%)

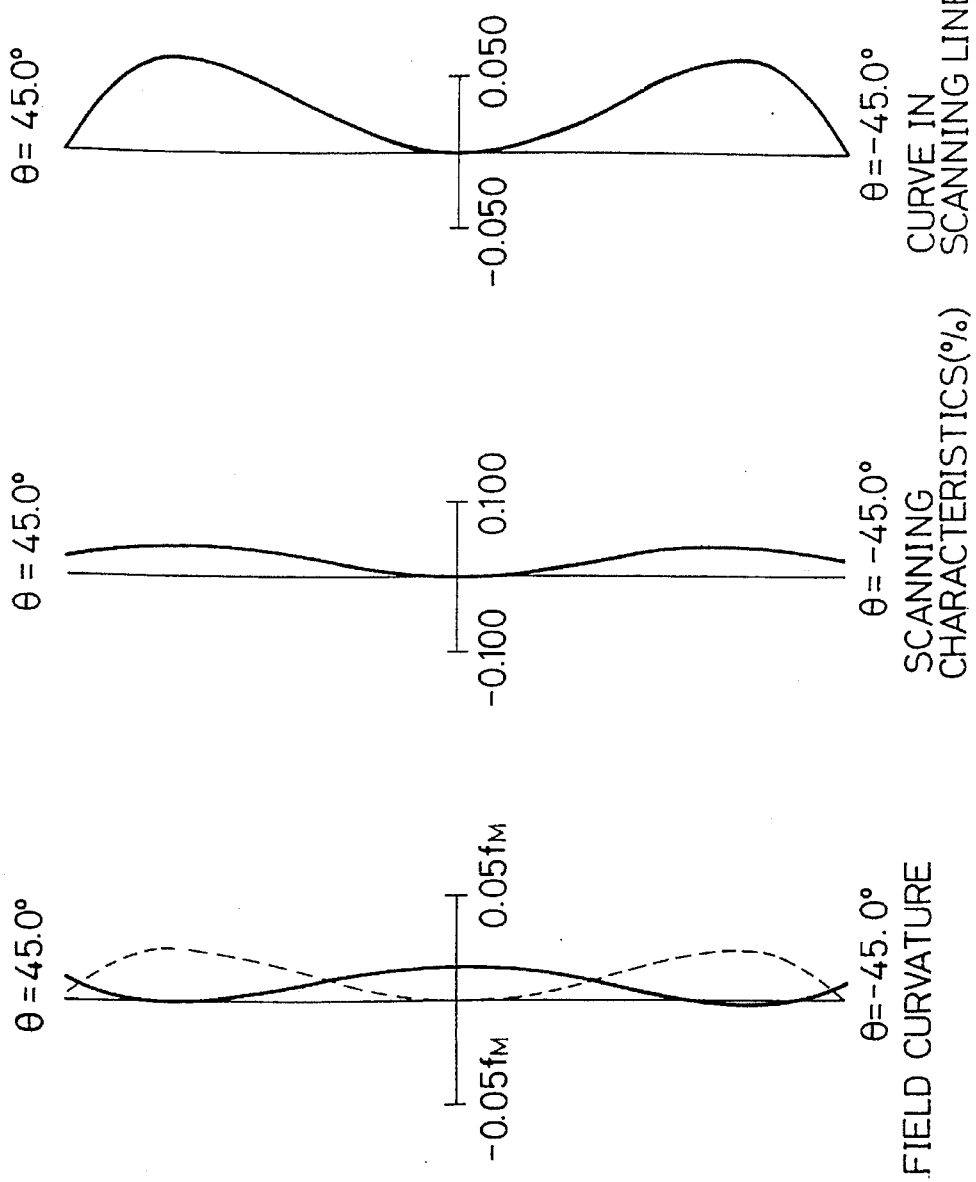

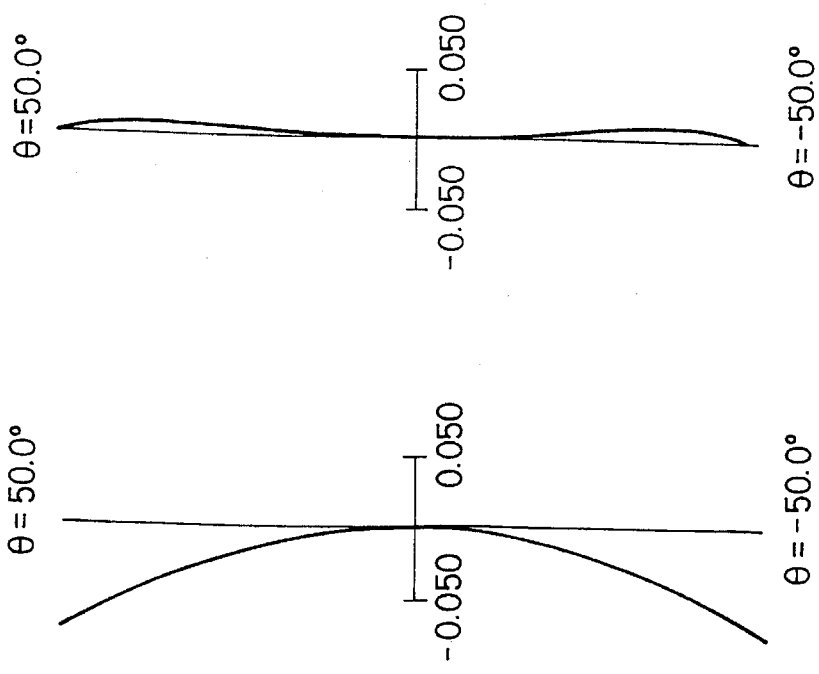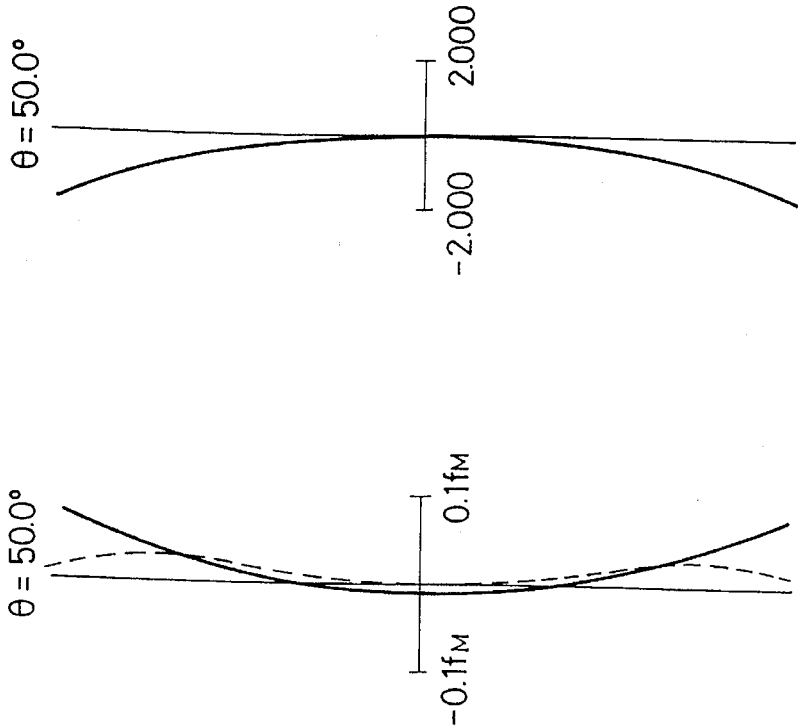

θ = 50.0°

−0.050   0.050

θ = −50.0°

θ = 50.0°

−0.050   0.050

θ = −50.0°

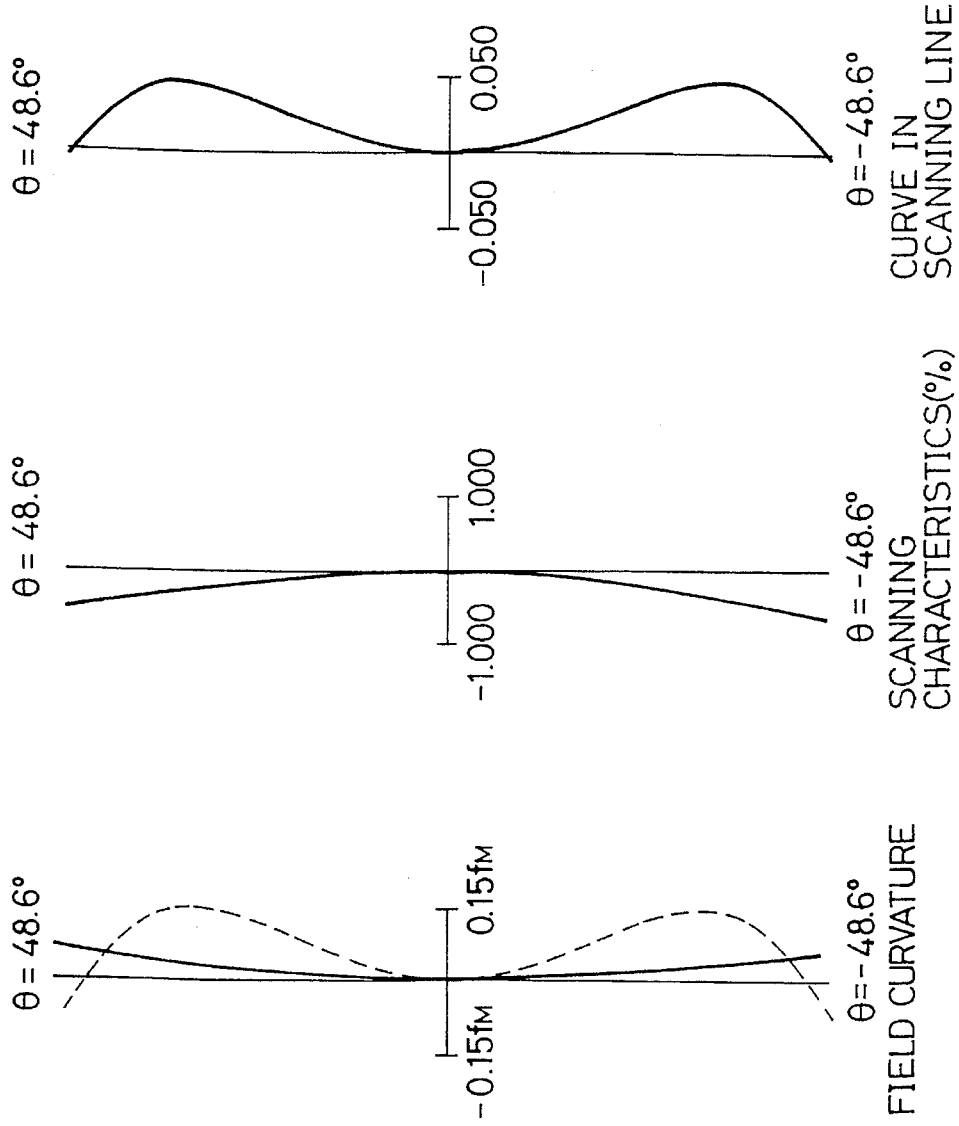

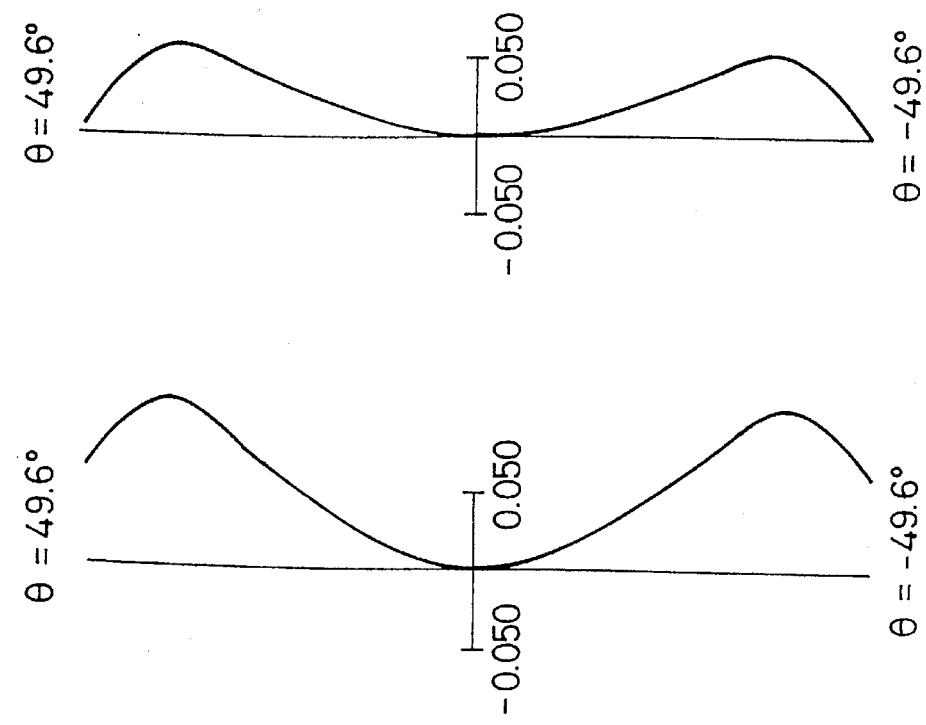
Fig.21a  Fig.21b
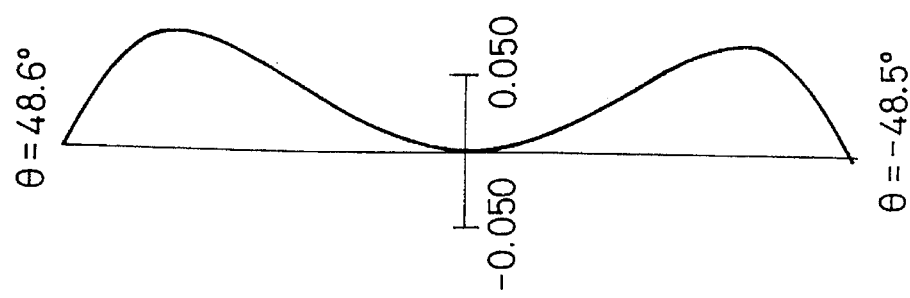
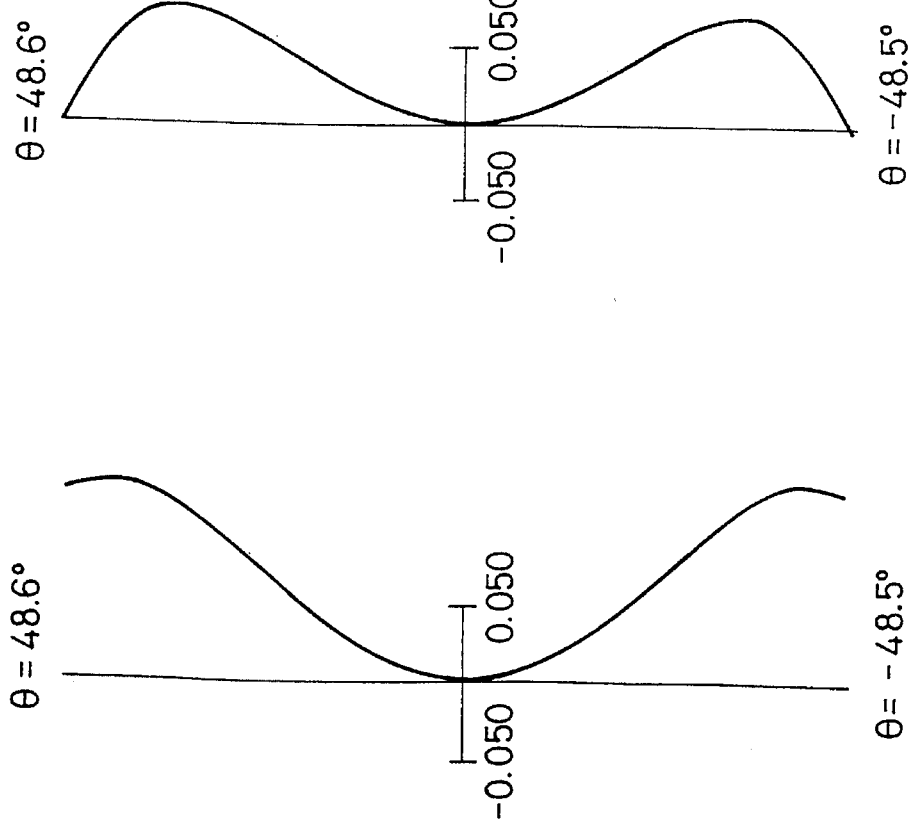
Fig.23a  Fig.23b

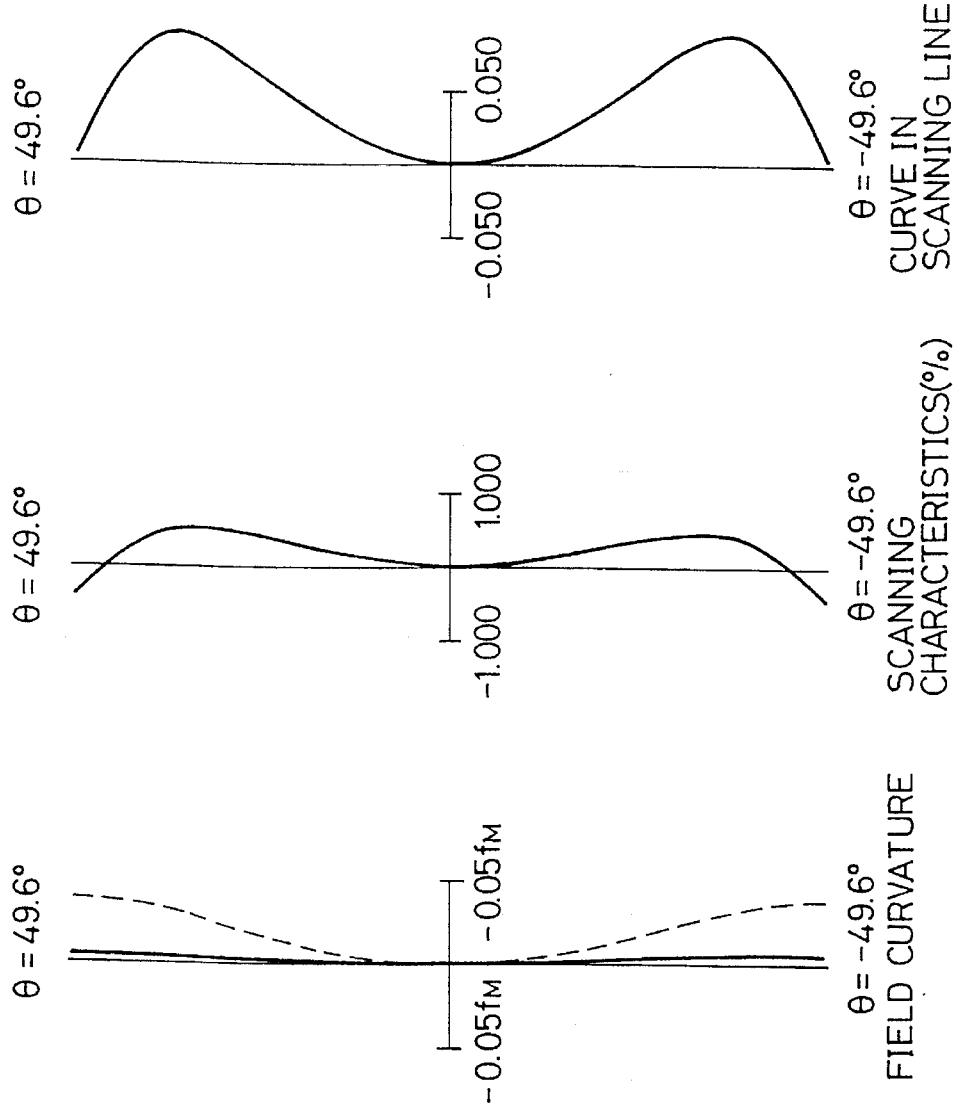

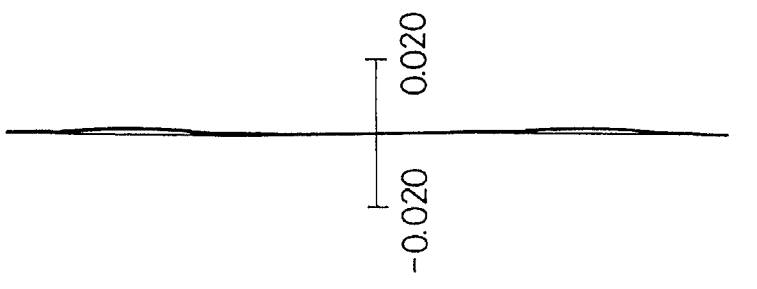
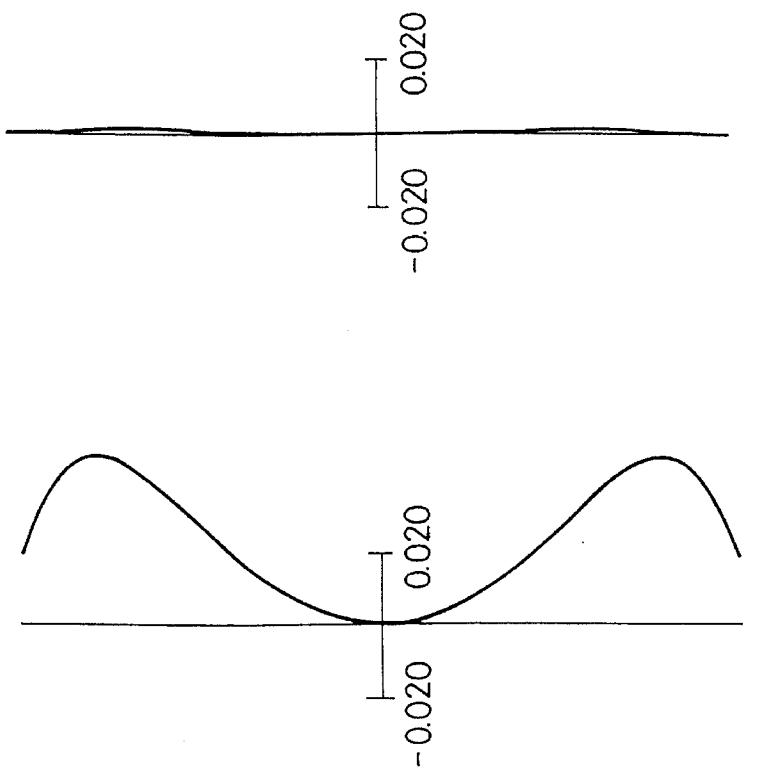
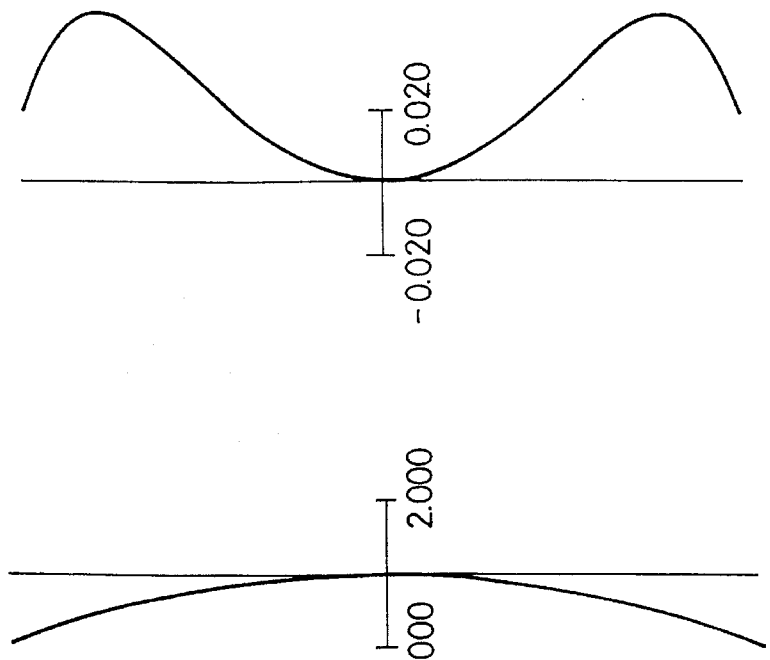
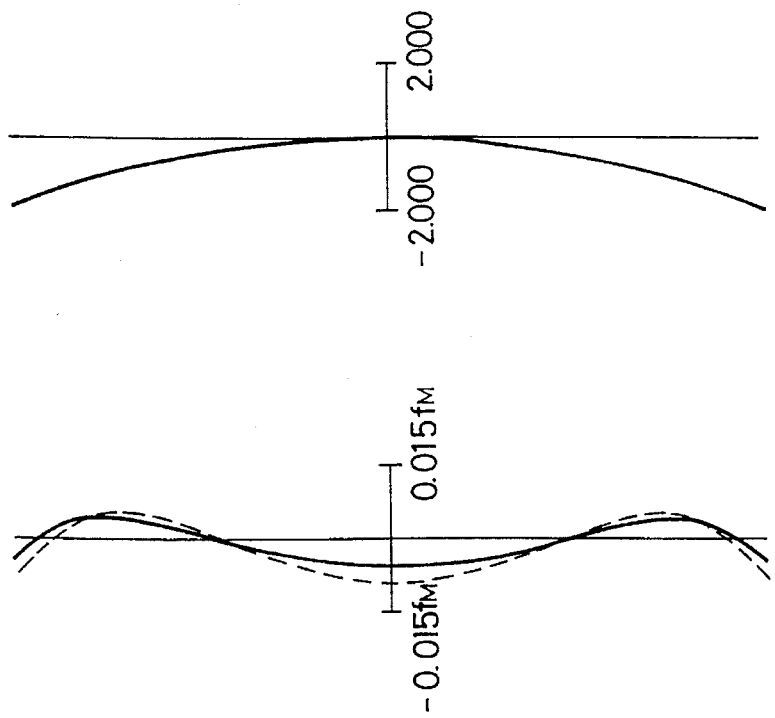

OPTICAL SCANNER

BACKGROUND OF THE INVENTION

1. Field of the Invention

The present invention relates to an optical scanner using an image forming reflecting mirror, etc.

2. Description of the Related Art

In an optical scanner, a light beam is deflected at an equal angular velocity and is converged as a light spot on a scanned face to perform an optical scanning operation on the scanned face. Various kinds of optical scanners each having such a structure are generally known in association with an optical printer, etc. An fθ lens generally constitutes an optical system for converging the deflected tight beam as a light spot on the scanned face and performing the optical scanning operation using the light spot at an equal speed. However, an image forming reflecting mirror having a linearity correcting function has been recently proposed instead of the fθ lens. For example, Japanese Patent Application Laying Open (KOKAI) No. 1-200221 shows such an image forming reflecting mirror.

In the optical scanner using such an image forming reflecting mirror, a scanning line as a moving locus of the light spot to be linear tends to be curved. Curving of the scanning line is called as a curve in the scanning line.

In the optical scanner using the above image forming reflecting mirror, the deflected light beam incident to the image forming reflecting mirror and the deflected light beam reflected on the image forming reflecting mirror are located on the same side with respect to the image forming reflecting mirror. Accordingly, it is necessary to use an optical arrangement in which these reflected light beams are separated from each other and the reflected deflected light beam is not returned to the side of a light source, but is guided to a side of the scanned face. In such an optical arrangement, there is a case in which the scanning line is necessarily curved.

Such a curve in the scanning line caused by the optical arrangement can be corrected by shifting a position of the image forming reflecting mirror in a cross-scan corresponding direction or inclining the image forming reflecting mirror to such an extent that no practical problems are caused. However, a very high accuracy in arrangement of each of optical elements arranged on an optical path from the light source to the scanned face is required to correct this curve as designed. Therefore, when errors in accuracy in arrangement of the optical elements are accumulated, the scanning line is greatly curved.

For example, such a curve in the scanning line causes a great problem in a two-color printer, etc. for performing a writing operation using a separate optical scanning operation every color information. For example, when a scanning line L is set to an ideal scanning line in FIG. 6, there is a case in which scanning lines $L_1$ and $L_2$ for writing respective chromatic information of two colors are curved in opposite directions as shown in FIG. 6. In such a case, a shift of $(a_1+a_2)$ is caused at its maximum between the written chromatic information in both end portions of an optical scanning region. Accordingly, a so-called color shift is markedly caused.

SUMMARY OF THE INVENTION

It is therefore an object of the present invention to provide a novel optical scanner using an image forming reflecting mirror in which a curve in a scanning line caused by errors in arrangement of optical elements can be effectively reduced.

Another object of the present invention is to provide a novel optical scanner using an image forming reflecting mirror in which a curve in a scanning line caused by errors in arrangement of optical elements can be effectively reduced and the generation of a jitter caused by inclination of a deflecting face of an optical deflector can be effectively prevented.

The above objects of the present invention can be achieved by an optical scanner comprising a light source device for emitting a light beam for performing an optical scanning operation; a linear image forming optical system for forming the light beam from the light source device as a linear image extending in a main scan-corresponding direction; an optical deflector for reflecting the light beam from this linear image forming optical system on a deflecting reflecting face and deflecting the reflected light beam at an equal angular velocity; a light spot image forming optical system for guiding the deflected light beam onto a scanned face and converging the deflected light beam as a light spot on the scanned face; an adjusting mechanism for displacing and adjusting a position of the linear image forming optical system in a cross scan-corresponding direction; and an image forming reflecting mirror for converging the detected light beam onto the scanned face by the light spot image forming optical system in at least the main scan-corresponding direction and having a function for performing the optical scanning operation at an equal speed.

In accordance with this optical scanner, a curve in a scanning line caused by errors in arrangement of optical elements can be effectively reduced and the generation of a jitter caused by inclination of the deflecting reflecting face of the optical deflector can be effectively prevented.

Further objects and advantages of the present invention will be apparent from the following description of the preferred embodiments of the present invention as illustrated in the accompanying drawings.

BRIEF DESCRIPTION OF THE DRAWINGS

FIGS. 12a, 12b and 12c are diagrams respectively showing field curvature, scanning characteristics and a curve in a scanning line when the concrete example 1 is ideally embodied, and showing designed values of the field curvature, the scanning characteristics and this curve;

FIG. 15a is a diagram showing a curve in a scanning line caused by an error in an optical arrangement in the concrete example 3 before this curve is corrected;

FIG. 15b is a diagram showing a curve in a scanning line caused by an error in an optical arrangement in the concrete example 3 after this curve is corrected;

FIGS. 16a and 16b are diagrams respectively showing field curvature and scanning characteristics of the optical scanner when concrete example 4 is ideally embodied, and showing designed values of the field curvature and the scanning characteristics;

FIGS. 20a, 20b and 20c are diagrams respectively showing field curvature, scanning characteristics and a curve in a scanning line when concrete example 5 is ideally embodied, and showing designed values of the field curvature, the scanning characteristics and this curve;

FIG. 21a is a diagram showing a curve in a scanning line caused by an error in an optical arrangement in the concrete example 5 before this curve is corrected;

FIG. 21b is a diagram showing a curve in a scanning line caused by an error in an optical arrangement in the concrete example 5 after this curve is corrected;

FIGS. 22a, 22b and 22c are diagrams respectively showing field curvature, scanning characteristics and a curve in a scanning line when concrete example 6 is ideally embodied, and showing designed values of the field curvature, the scanning characteristics and this curve;

FIG. 23a is a diagram showing a curve in a scanning line caused by an error in an optical arrangement in the concrete example 6 before this curve is corrected;

FIG. 23b is a diagram showing a curve in a scanning line caused by an error in an optical arrangement in the concrete example 6 after this curve is corrected;

FIGS. 25a and 25b are diagrams respectively showing field curvature and scanning characteristics of the optical scanner when concrete example 7 is ideally embodied, and showing designed values of the field curvature and the scanning characteristics;

FIG. 25a is a diagram showing a curve in a scanning line caused by an error in an optical arrangement in the concrete example 7 before this curve is corrected;

FIG. 26b is a diagram showing a curve in a scanning line caused by an error in an optical arrangement in the concrete example 7 after this curve is corrected;

DESCRIPTION OF THE PREFERRED EMBODIMENTS

Figure 1:
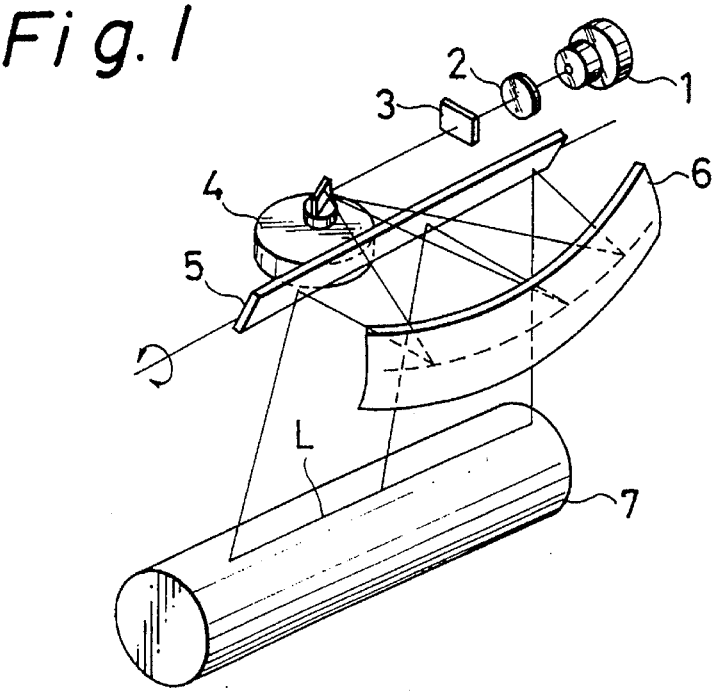
FIG. 1 is a view for explaining an optical scanner in accordance with one embodiment of the present invention.

The preferred embodiments of an optical scanner in the present invention will next be described in detail with reference to the accompanying drawings.

In accordance with a first structure of the present invention, an optical scanner has a light source device, a linear image forming optical system, an optical deflector, a light spot image forming optical system and an adjusting mechanism.

The light source device emits a light beam for performing an optical scanning operation. The light source device can be constructed by a light source such as a semiconductor laser, a light emitting diode, etc., or a combination of this light source and a coupling lens.

The linear image forming optical system forms the light beam from the light source device as a linear image extending in a main scan-corresponding direction. The linear image forming optical system can be constructed by an optical system having positive refracting power only in a cross scan-corresponding direction such as a cylindrical lens described later, a cylindrical mirror, etc. The linear image forming optical system can be also constructed by an optical system having refracting power in each of the cross scan-corresponding direction and the main scan-corresponding direction.

The main scan-corresponding direction is set to a direction parallel and corresponding to a main scanning direction on a virtual optical path on which an optical path from the light source to a scanned face is linearly developed. The cross scan-corresponding direction is set to a direction parallel and corresponding to a cross scanning direction on this virtual optical path.

The optical deflector reflects the light beam from the linear image forming optical system on a deflecting reflecting face and deflects the reflected light beam at an equal angular velocity.

The light spot image forming optical system guides the deflected light beam onto the scanned face and converges the deflected light beam as a light spot on the scanned face. The light spot image forming optical system is constructed by various kinds of optical elements arranged on an optical path from the optical deflector to the scanned face.

An image forming reflecting mirror is included in this light spot image forming optical system. The image forming reflecting mirror has a function for converging the deflected light beam onto the scanned face in at least the main scan-corresponding direction and performing the optical scanning operation at an equal speed.

In addition to the image forming reflecting mirror, the light spot image forming optical system can include an elongated cylindrical lens, an elongated toroidal lens, or an elongated concave mirror equivalent to each of the elongated cylindrical lens and the elongated toroidal lens. The elongated cylindrical lens, the elongated toroidal lens, or the elongated concave mirror is arranged in the vicinity of the scanned face to correct field curvature in the cross scanning direction. Further, the light spot image forming optical system can include various kinds of optical elements for separating an optical path of the deflected light beam incident to the image forming reflecting mirror from an optical path of the deflected light beam reflected on the image forming reflecting mirror in accordance with necessity.

The adjusting mechanism displaces and adjusts a position of the linear image forming optical system in the cross scan-corresponding direction.

In accordance with the first structure of the present invention, the linear image extending in the main scan-corresponding direction may be formed by the linear image forming optical system in principle in an arbitrary regional position of an optical path from the linear image forming optical system to the image forming reflecting mirror.

In accordance with a ninth structure of the present invention, the optical deflector is constructed by a rotary polygon mirror, a pyramidal mirror or a rotary unifacial mirror. However, there is a case in which the optical scanner having the first structure has no function for correcting an inclination of the deflecting reflecting face. In such a case, the optical deflector is preferably constructed by the pyramidal mirror or the rotary unifacial mirror in which no practical problem is almost caused with respect to the inclination of the deflecting reflecting face.

In accordance with a second structure of the present invention, a reflecting face of the image forming reflecting mirror in the first structure is formed by an aspherical surface.

In accordance with a third structure of the present invention, the linear image forming optical system in each of the first and second structures is positioned such that the linear image extending in the main scan-corresponding direction is formed in the vicinity of the deflecting reflecting face of the optical deflector. The light spot image forming optical system in each of the first and second structures is constructed such that the light spot image forming optical system approximately sets positions of the deflecting reflecting face and the scanned face in a conjugate relation in geometrical optics with respect to the cross scan-corresponding direction.

The optical scanner having the third structure has a function for correcting the inclination of the deflecting reflecting face. Accordingly, the optical deflector can be freely constructed by a rotary polygon mirror, etc. having a reflecting face tending to be inclined.

The light spot image forming optical system can be constructed by various kinds of structures as mentioned above. For example, the light spot image forming optical system can be constructed by a combination of a spherical concave mirror and an elongated cylindrical lens. In accordance with a fourth structure of the present invention, the light spot image forming optical system is constructed by a single anamorphic image forming reflecting mirror having different image forming functions in the main scan-corresponding direction and the cross scan-corresponding direction.

In accordance with a sixth structure of the present invention, the light beam incident to the image forming reflecting mirror is convergent in the main scan-corresponding direction in each of the first to fifth structures of the optical scanner. In accordance with a seventh structure of the present invention, the light beam incident to the image forming reflecting mirror is divergent in the main scan-corresponding direction in each of the first to fifth structures of the optical scanner. In accordance with an eighth structure of the present invention, the light beam emitted from the light source device is set to a parallel light beam.

FIG. 1 shows an optical scanner in accordance with one embodiment of the present invention. In FIG. 1, a divergent light beam is emitted from a semiconductor laser as a light source 1 and is transmitted through a coupling lens 2. The coupling lens 2 changes the transmitted light beam to a convergent or divergent light beam. Otherwise, the coupling lens 2 may substantially change the transmitted light beam to a parallel light beam. In this embodiment, the coupling lens 2 substantially changes the transmitted light beam to a parallel light beam. The light source 1 and the coupling lens 2 constitute a light source device.

The light beam emitted from the light source device is transmitted through a cylindrical lens 3 as a linear image forming optical system so that the light beam is converged only in a cross scan-corresponding direction. This light beam is then formed as a linear image extending in a main scan-corresponding direction in the vicinity of a deflecting reflecting face of an optical deflector 4 as a rotary unifacial mirror. The light beam reflected on the deflecting reflecting face is further reflected on an image forming reflecting mirror 6 and an elongated mirror 5. Thus, the light beam is converged as a light spot on a photoconductive photosensitive body 7 arranged such that a generating line of the photosensitive body 7 is in conformity with a main scanning line L on a scanned face. The photosensitive body 7 is optically scanned by this light beam at an equal speed as the light beam is deflected by the optical deflector 4 at an equal angular velocity. The elongated mirror 5 is disposed to bend an optical path of the light beam and has no refracting power. The elongated mirror 5 and the image forming reflecting mirror 6 constitute a light spot image forming optical system.

An image forming action of the image forming reflecting mirror 6 will next be described with respect to each of the main scan-corresponding direction and the cross scan-corresponding direction. With respect to the main scan-corresponding direction, a parallel light beam transmitted through the coupling lens 2 is converged by the image forming reflecting mirror 6 as a light spot on the photosensitive body 7. With respect to the cross scan-corresponding direction, as mentioned above, an image formed by the image forming reflecting mirror 6 constitutes the light spot on the photosensitive body 7 in a state in which an object point is constructed by a linear image formed by the cylindrical lens 3 and extending in the main scan-corresponding direction. In this example, the linear image is formed in the vicinity of the deflecting reflecting face. Accordingly, the image forming reflecting mirror 6 approximately sets positions of the deflecting reflecting face and the scanned face in a conjugate relation in geometrical optics with respect to the cross scan-corresponding direction. Namely, the image forming reflecting mirror 6 is set to be anamorphic.

Figure 3:
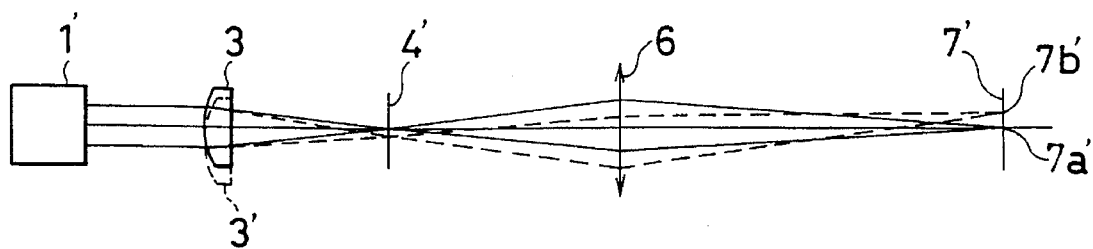
FIG. 3 is a view for explaining correction of a curve in a scanning line by displacing a linear image forming optical system in a cross-scan corresponding direction.

FIG. 3 shows a state in which an optical path from a light source device 1' to a scanned face 7' is linearly developed and the cross scan-corresponding direction is set to a vertical direction. Reference numeral 4' designates a deflecting reflecting face of the optical deflector 4. When the cylindrical lens 3 is located in a position shown by a solid line, the light spot is converged in a position 7a' on the scanned face 7'. When the cylindrical lens 3 is displaced until a position shown by a broken line in the cross scan-corresponding direction, a convergent position of the light spot is displaced in the cross scan-corresponding direction until a position 7b'. A curve in a scanning line can be corrected by utilizing this displacement.

Figure 2A:
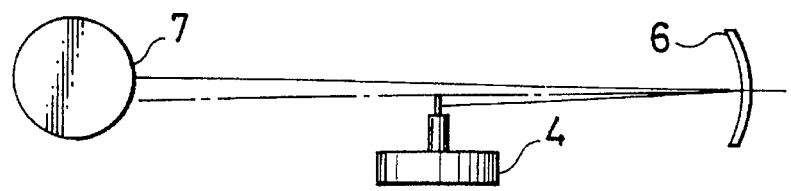
FIGS. 2a, 2b and 2c are views showing three examples of a system for separating a light beam incident to an image forming reflecting mirror from a light beam reflected on the image forming reflecting mirror.
Figure 2B:
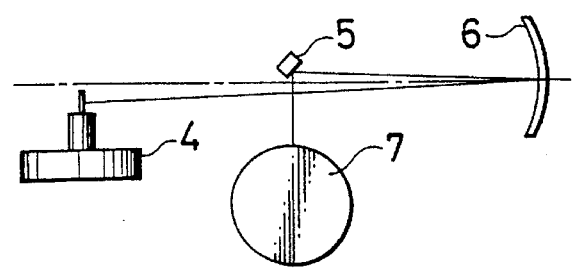
Figure 2C:
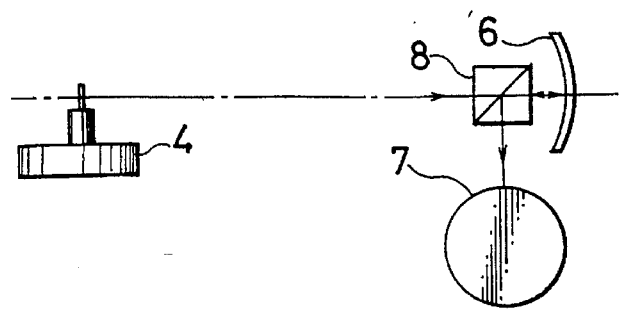

In the optical scanner using the image forming reflecting mirror 6, the deflected light beam is reflected on the image forming reflecting mirror 6 on an incident side thereof. Accordingly, it is necessary to separate an optical path of the reflected light beam from an optical path of the incident light beam. It is possible to use various kinds of methods for separating these optical paths from each other. FIGS. 2a to 2c show three typical examples of an optical path separating method. Each of FIGS. 2a and 2b shows an optical path separating system in which a light beam incident to the image forming reflecting mirror 6 is inclined with respect to the cross scan-corresponding direction set to a vertical direction. In FIG. 2a, the light beam reflected on the image forming reflecting mirror 6 is directly incident to a photosensitive body 7. In FIG. 2b, an optical path of the reflected light beam is bent by an elongated mirror 5 and is guided to a photosensitive body 7. The optical path separating system shown in FIG. 2b is used in the optical scanner shown in FIG. 1. FIG. 2c shows an optical path separating system using an elongated beam splitter 8.

In the optical path separating systems of FIGS. 2a and 2b, the locus of an incident position of the deflected light beam incident to the image forming reflecting mirror 6 is not parallel to the main scan-corresponding direction perpendicular to a paper face, but is curved. Therefore, in such optical path separating systems, a main scanning line on the scanned face is curved so that a curve in a scanning line is caused in principle. Such a curve in a scanning line can be reduced in principle by slightly inclining an optical axis of the image forming reflecting mirror 6 in the cross scan-corresponding direction to such an extent that no practical problems are caused. Such a curve in a scanning line can be also reduced in principle by slightly displacing the optical axis of the image forming reflecting mirror 6 in parallel with the cross scan-corresponding direction to position this image forming reflecting mirror 6 to such an extent that no practical problems are caused. Otherwise, such a curve in a scanning line can be reduced in principle by a combination of this parallel displacement and the above inclination to such an extent that no practical problems are caused.

The reflecting face of the image forming reflecting mirror 6 can be formed by a spherical surface which is coaxial and symmetrical. When the reflecting face of the image forming reflecting mirror 6 is constructed by an aspherical surface in accordance with a second structure of the optical scanner in the present invention, it is possible to preferably perform a scanning operation at an equal speed by using this aspherical reflecting face.

In accordance with a third structure of the optical scanner in the present invention, a linear image is formed by the linear image forming optical system in the vicinity of the deflecting reflecting face. Further, positions of the deflecting reflecting face and the scanned face are approximately set by a light spot image forming optical system in a conjugate relation in geometrical optics with respect to the cross scan-corresponding direction. In accordance with this third structure, no convergent position of a light spot is displaced in a cross scanning direction irrespective of inclination of the deflecting reflecting face.

In accordance with a fourth structure of the present invention, an anamorphic image forming reflecting mirror is used in the optical scanner. In this fourth structure, it is possible to correct field curvature in the cross scanning direction and correct the inclination of the deflecting reflecting face without using the above elongated cylindrical lens and a toroidal lens, etc.

Concrete embodiments of the present invention will next be described.

A first embodiment is an example in which optical paths are separated from each other in the optical path separating system shown in FIG. 2c in a structure similar to that of the optical scanner explained with reference to FIG. 1. In this embodiment, a deflected light beam can be incident and reflected on a symmetrical face including an optical axis of the image forming reflecting mirror 6. Accordingly, no curve in a scanning line is caused in principle on the basis of an optical arrangement.

Figure 4:
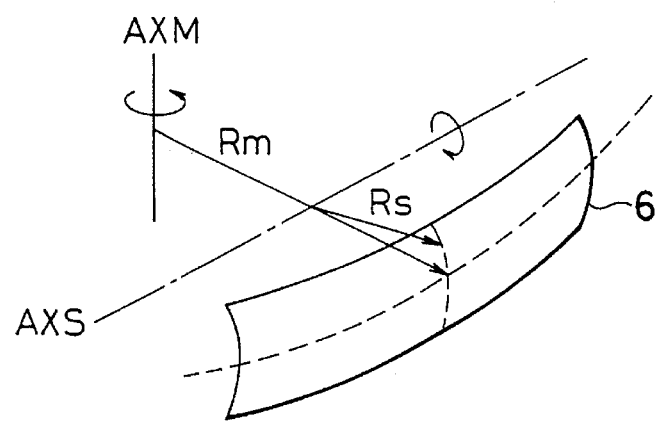
FIG. 4 is a view for explaining an aspherical shape of a reflecting face of an image forming mirror system 6 in the embodiment shown in FIG. 1.

The shape of a reflecting face of the image forming reflecting mirror 6 will next be explained. The reflecting face of the image forming reflecting mirror 6 is specified as follows. Namely, as shown in FIG. 4, radii of curvature of the reflecting face corresponding to maximum and minimum curvatures are respectively set to Rs and Rm in the position of an intersecting point between an optical axis of the reflecting face of the image forming reflecting mirror 6 and this reflecting face. These maximum and minimum curvatures relate to two symmetrical faces perpendicular to each other on the reflecting face. Namely, the two symmetrical faces include the optical axis of the reflecting face and are perpendicular to each other. The radius of curvature of an intersecting line between the reflecting face and one symmetrical face (which is temporarily called a maximum curvature symmetrical face) is equal to the above Rs at an intersecting point of the optical axis and the reflecting face. The radius of curvature of an intersecting line between the reflecting face and the other symmetrical face (which is temporarily called a minimum curvature symmetrical face) is equal to the above Rm at an intersecting point of the optical axis and the reflecting face.

The intersecting line of the reflecting face and the above minimum curvature symmetrical face is shown by a horizontal broken line in FIG. 4. In the following description, X is set to a coordinate in an direction of the optical axis and the above intersecting point is set to an origin. Further, Y is set to a coordinate in a direction perpendicular to the optical axis on the minimum curvature symmetrical face and K is set to a conical constant. In this case, the intersecting line of the reflecting face and the above minimum curvature symmetrical face is equal to a curve represented by the following general formula (1).

$$X=Y^2/[Rm+\sqrt{\{Rm^2-(1+K)Y^2\}}] \quad (1)$$

In FIG. 4, axis AXM is an axis perpendicular to the minimum curvature symmetrical face in a position separated by the curvature radius Rm from the above intersecting point on the optical axis. Further, axis AXS is an axis perpendicular to the optical axis on the minimum curvature symmetrical face in a position separated by the curvature radius Rs from the above intersecting point.

The shape of the reflecting face of the image forming reflecting mirror 6 is an anamorphic aspherical shape obtained by rotating the curve (shown by a horizontal broken line in FIG. 4) represented by the formula (1) around the axis AXS. Therefore, this aspherical surface is a barrel type toric face. The image forming reflecting mirror 6 is used in a state in which a direction of the axis AXS is parallel to the main scan-corresponding direction. A curve additionally having higher order correction terms of $AY^2+BY^3+\cdots$ may be used in the above formula (1) in accordance with necessity.

Figure 5:
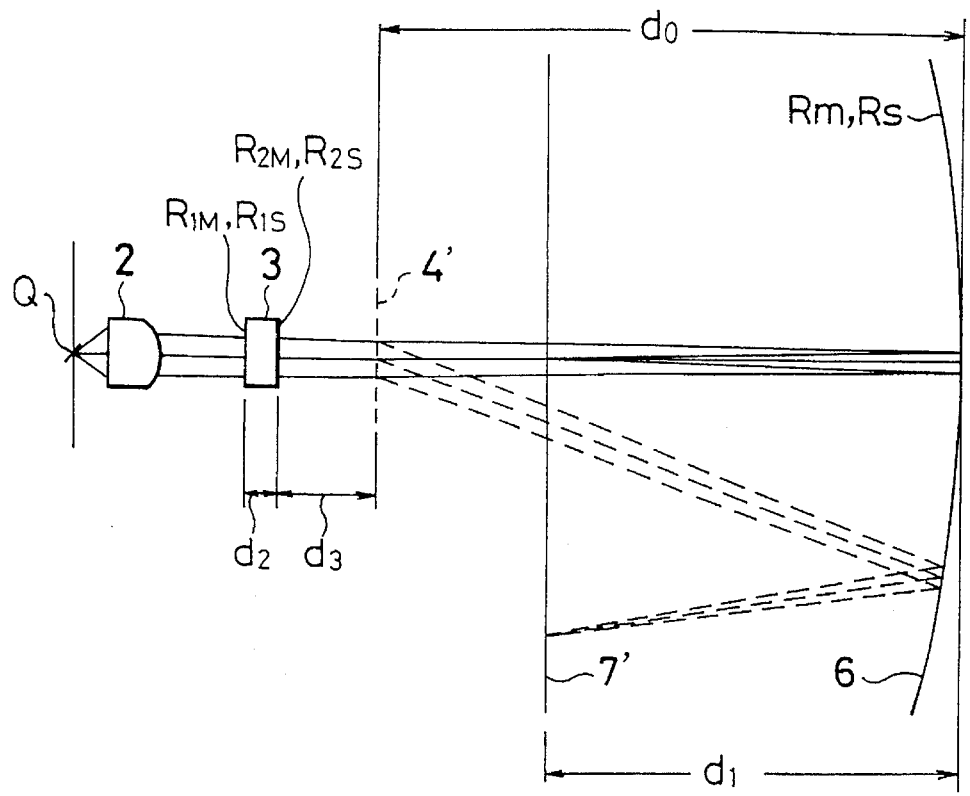
FIG. 5 is a view for explaining concrete example 1.
Figure 6:
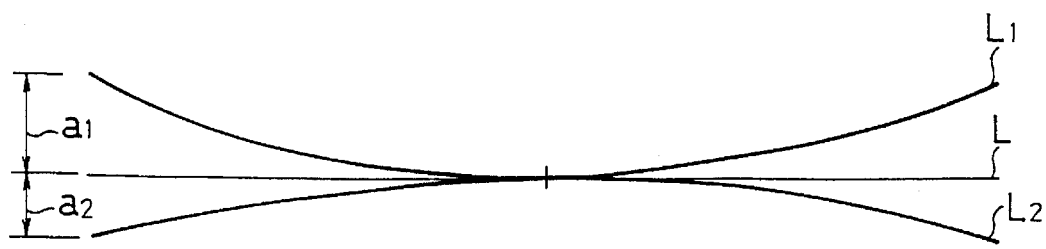
FIG. 6 is a view for explaining problems caused by a curve in a scanning line.

FIG. 5 schematically shows an optical path from the light source to the scanned face in this embodiment such that the main scan-corresponding direction is set to a vertical direction. As shown in FIG. 5, in each of the concrete examples, $R_{1M}$ is set to a radius of curvature of a light source side lens face of the cylindrical lens 3 in the main scan-corresponding direction. $R_{2M}$ is set to a radius of curvature of a deflecting reflecting side lens face of the cylindrical lens 3 in the main scan-corresponding direction. $R_{1S}$ is set to a radius of curvature of the light source side lens face of the cylindrical lens 3 in the cross scan-corresponding direction. $R_{2S}$ is set to a radius of curvature of the deflecting reflecting side lens face of the cylindrical lens 3 in the cross scan-corresponding direction. Rm is set to a radius of curvature of the reflecting face of the image forming reflecting mirror 6 on the optical axis with respect to the main scan-corresponding direction. K is set to a conical constant. Rs is set to a radius of curvature of the reflecting face of the image forming reflecting mirror 6 on the optical axis with respect to the cross scan-corresponding direction. $d_0$ is set to a distance from a deflecting reflecting face 4' to the reflecting face of the image forming reflecting mirror 6. $d_1$ is set to a distance from the above reflecting face of the image forming reflecting mirror 6 to a scanned face 7'. $d_2$ is set to a thickness of the cylindrical lens 3. Reference numeral n is set to a refractive index of the cylindrical lens 3. Further, $d_3$ is set to a distance between the cylindrical lens 3 and the deflecting reflecting face 4'.

In each of the following concrete examples, $S_0$ shows the position of an object point provided when an image is formed by the image forming reflecting mirror 6 in the main scan-corresponding direction. Namely, $S_0$ designates a distance from the reflecting face to the position of the object point. $S_0$ is negative when this object point is located on this side of the reflecting face, i.e., the light source side on an optical path of light. An angle of deflection of light deflected by the optical deflector 4 is set to ±50 degrees and a focal length $f_M$ of the image forming reflecting mirror 6 with respect to the main scan-corresponding direction is normalized to 100.

In this embodiment, a light beam incident to the image forming reflecting mirror 6 is convergent in the main scan-corresponding direction. At this time, the above object point is a natural convergent point of this convergent light beam at which the light beam is naturally converged on the optical path without any influence of the other optical systems on the light beam. In the following concrete example 1, the above $S_0$ is positive since the object point is located after the image forming reflecting mirror 6.

CONCRETE EXAMPLE 1

Figure 7A:
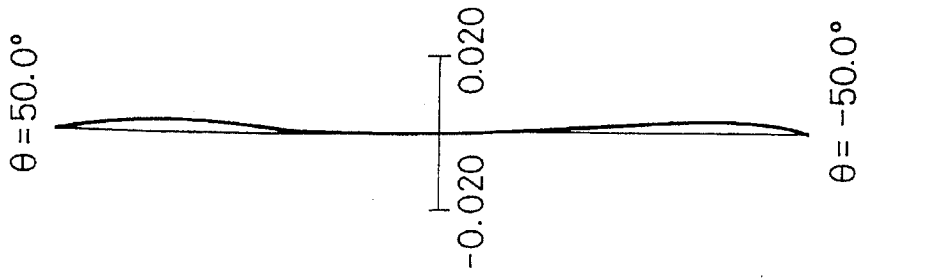
FIGS. 7a and 7b are diagrams respectively showing field curvature and scanning characteristics of the optical scanner when the concrete example 1 is ideally embodied, and showing designed values of the field curvature and the scanning characteristics.
Figure 7B:
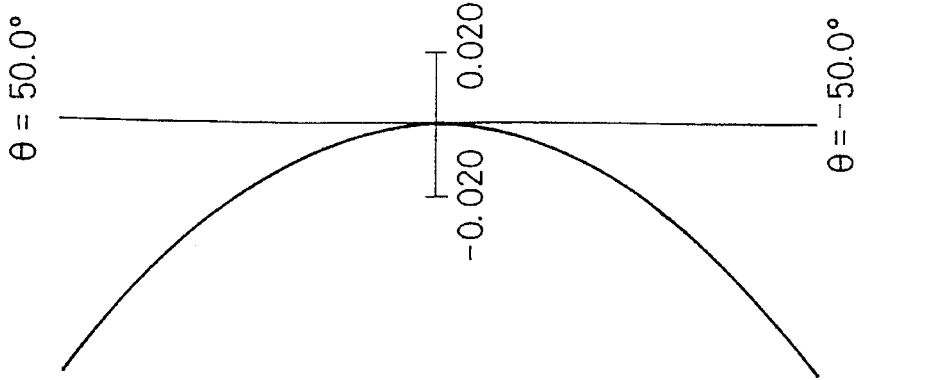

$R_{1M}=\infty$  $R_{1S}=19.468$  $d_2=3.632$  $n=1.51118$ $R_{2M}=\infty$  $R_{2S}=\infty$  $d_3=32.228$ $S_0=285.769$  $d_0=60.385$ $Rm=-200$  $Rs=-66.830$  $d_1=-74.077$ $K=-0.4$ FIGS. 7a and 7b show field curvature and scanning characteristics of the optical scanner when this concrete example 1 is ideally embodied. In FIG. 7a, broken and solid lines respectively show field curvatures in the main scan-corresponding direction and the cross scan-corresponding direction. The scanning characteristics shown in FIG. 7b are defined by the following formula, $$[\{Hr(\theta)/Hi(\theta)\}-1]\times 100\ (\%)$$

when the height of an ideal image at an angle $\theta$ of deflection of light is set to $Hi(\theta)$ and a height of the actual image is set to $Hr(\theta)$. The scanning characteristics correspond to $f\theta$ characteristics defined with respect to an $f\theta$ lens.

Figure 8A:
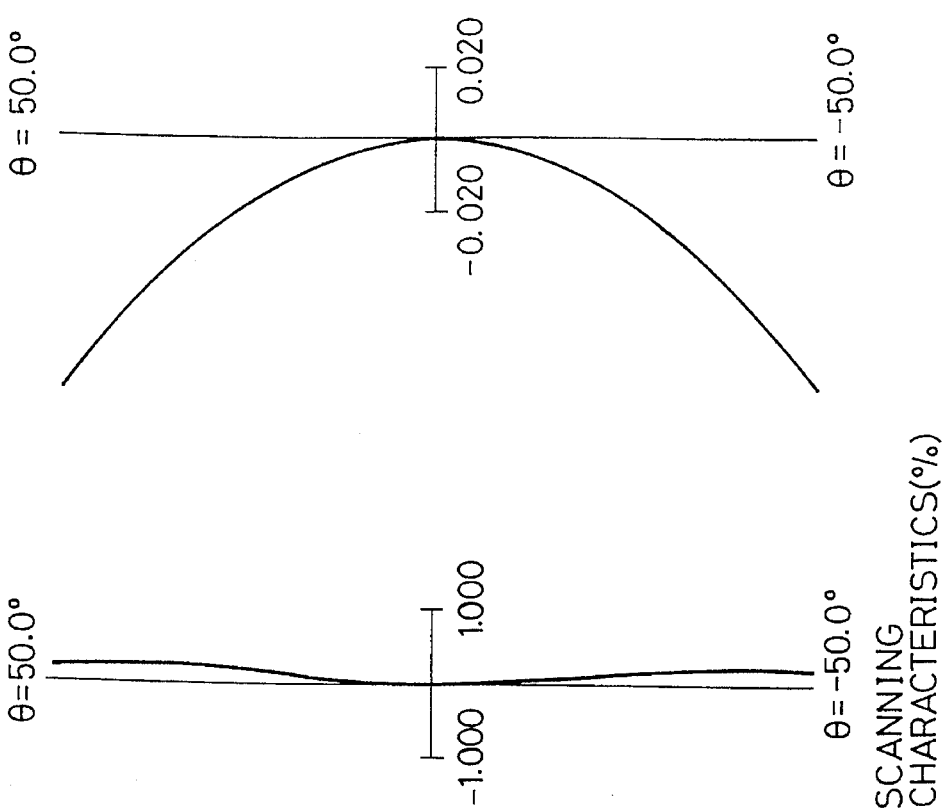
FIG. 8a is a diagram showing a curve in a scanning line caused by an error in an optical arrangement in the concrete example 1 before this curve is corrected.
Figure 8B:
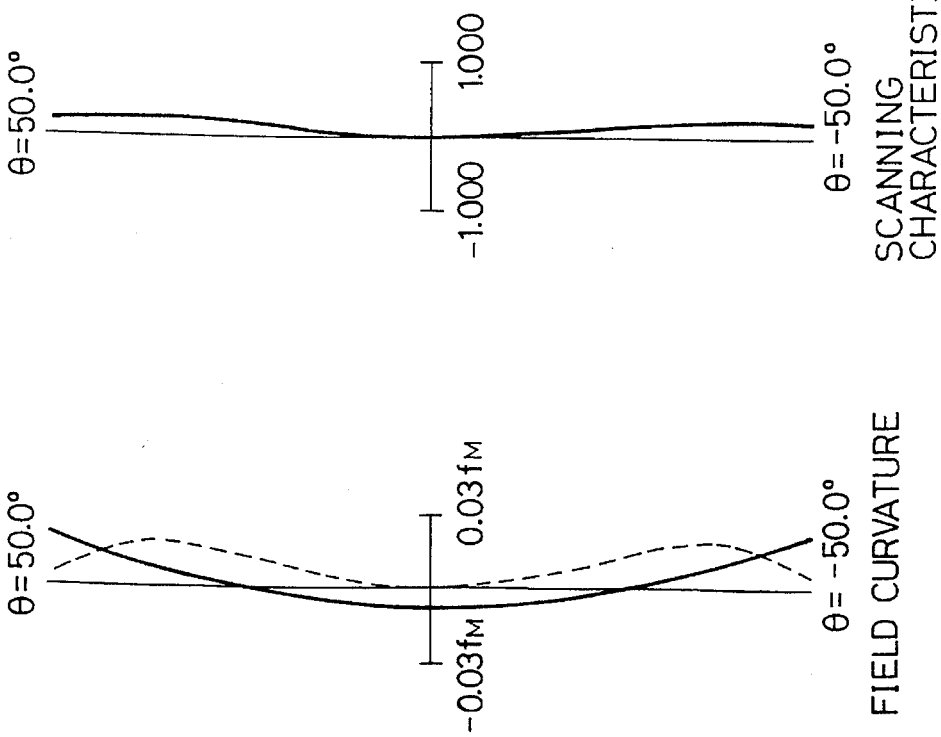
FIG. 8b is a diagram showing a curve in a scanning line caused by an error in an optical arrangement in the concrete example 1 after this curve is corrected.

When this concrete example 1 is embodied, a position of the image forming reflecting mirror 6 is shifted by e.g., +0.2 mm in the cross scan-corresponding direction by an error in an optical arrangement. "+" shows an upper position from the optical axis in FIG. 2c. In this case, as shown in FIG. 8a, a scanning line is greatly curved so that a curving amount of 68 μm is caused at a maximum deflection angle of ±50 degrees. At this time, when the cylindrical lens 3 is moved by +0.3 mm in the cross scanning direction to correct the scanning line, the curve in the scanning line is preferably corrected as shown in FIG. 8b.

Figure 9:
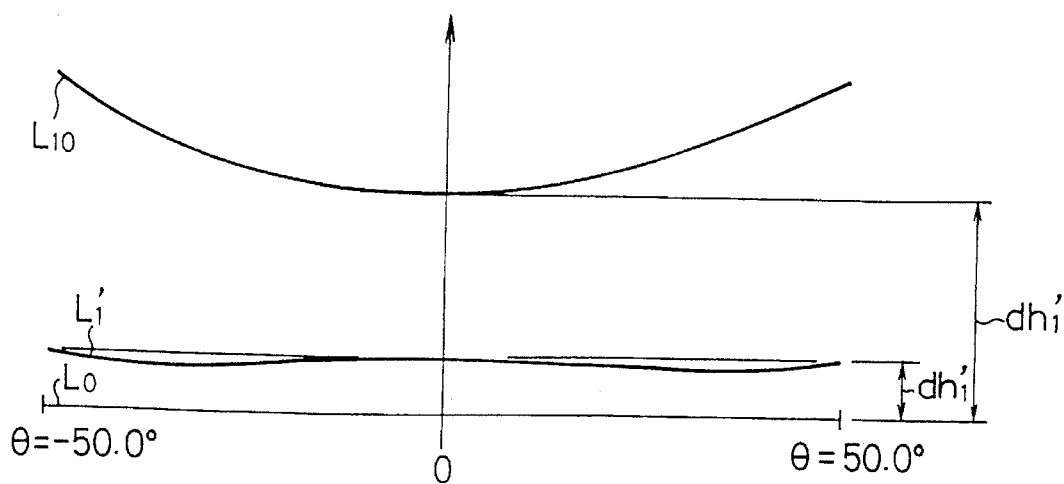
FIG. 9 is a view showing the relation in position between an ideal scanning line in the concrete example 1 and uncorrected and corrected scanning lines before and after the curve in the scanning line is corrected.

FIG. 9 shows a state of the scanning line in the above concrete example 1. In FIG. 9, reference numeral $L_0$ designates a scanning line obtained by a design. This designed scanning line is an ideal scanning line realized when each of optical elements is assembled with designed accuracy. As mentioned above, when an error in an assembly position of the image forming reflecting mirror 6 is set to +0.2 mm, the scanning line is not only curved as shown by reference numeral $L_{10}$, but is also shifted by a distance $dh_1$ from a position of the ideal scanning line $L_0$ in the cross scanning direction. In this embodiment, $dh_1$ is set to 0.443 min.

At this time, as explained in the above concrete example 1, when the cylindrical lens 3 is displaced by +0.3 mm in the cross scan-corresponding direction to correct the curve in the scanning line, a curve in a corrected scanning line $L_1'$ is reduced so that the corrected scanning line is substantially set to be linear. Further, a position of this corrected scanning line approaches a position of the ideal scanning line $L_0$. In this case, a distance $dh_1'$ between the corrected and ideal scanning lines is set to 0.116 mm.

When an optical scanning operation is performed by a single optical scanner, there is no problem even when the actual scanning line $L_1'$ is shifted from the ideal scanning line $L_0$ as mentioned above. However, when the above-mentioned two-color printer, etc. for performing a writing operation by two or more optical scanners are used, there is a case in which a shift in position of the scanning line markedly causes a shift in color. In such a case, in this embodiment, the elongated beam splitter 8 used to separate optical paths from each other is arranged such that this beam splitter 8 can be swung or rotated around an axis parallel to a longitudinal direction of the splitter 8 as shown in FIG. 2c. The shift in the scanning line can be easily corrected by adjusting an inclination of the beam splitter in accordance with a fifth structure of the present invention.

Figure 10:
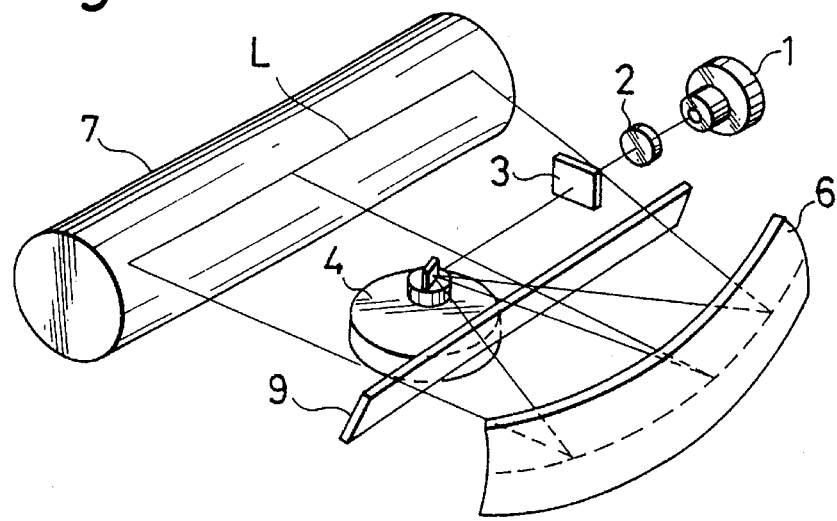
FIG. 10 is a view for explaining an optical scanner in accordance with another embodiment of the present invention.

FIG. 10 schematically shows only a main portion of an optical scanner in accordance with another embodiment of the present invention. For brevity, constructional portions similar to those in FIG. 1 are designated by the same reference numerals as FIG. 1. Different from the first embodiment of FIG. 1, a transparent plane parallel plate 9 is used as a means for separating optical paths from each other in the embodiment of FIG. 10. This transparent plane parallel plate 9 is shown in detail in FIG. 11.

Figure 11:
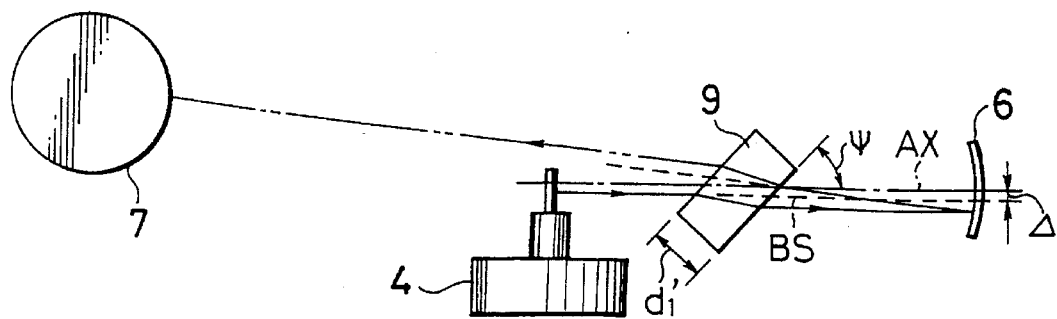
FIG. 11 is a view for explaining separation of optical paths in the embodiment shown in FIG. 10.

In the following description, reference numeral n' designates a refractive index of the plane parallel plate 9. $d_1'$ designates a thickness of the plane parallel plate 9. $d_0'$ designates a distance between a deflecting reflecting face of an optical deflector 4 and the plane parallel plate 9. $d_2'$ designates a distance between the plane parallel plate 9 and a reflecting face of an image forming reflecting mirror 6. $d_3'$ designates a distance from a face of the plane parallel plate 9 on a side of the image forming reflecting mirror 6 to a scanned face on an optical axis of the optical scanner. In FIG. 11, reference numeral BS shows a plane drawn by performing a scanning operation using a principal ray of a light beam deflected by the optical deflector 4. A shifting amount $\Delta$ of the image forming reflecting mirror 6 is set to a distance between this plane BS and an optical axis AX of the reflecting face of the image forming reflecting mirror 6. Reference numeral $\psi$ designates an ankle of inclination of the plane parallel plate 9 with respect to the above optical axis AX. Similar to the concrete example 1, these values are provided as follows in concrete example 2.

CONCRETE EXAMPLE 2

$R_{1M} = \infty$   $R_{1S} = 11.455$   $d_2 = 4.575$   $n = 1.51118$ $R_{2M} = \infty$   $R_{2S} = \infty$   $d_3 = 41.171$ $S_0 = -267.465$   $d_0' = 18.397$ $d_1' = 7.573$   $n' = 1.51118$ $Rm = -200$   $Rs = -99.543$   $d_2' = 28.362$ $K = -1.89$   $d_3' = -121.017$ $\Delta = 0.549$   $\phi = 56.506$ As can be seen from a negative value of $S_0$, a light beam incident to the image forming reflecting mirror 6 is a divergent light beam in a main scan-corresponding direction in this concrete example 2.

FIGS. 12a, 12b and 12c respectively show field curvature, scanning characteristics and a curve in a scanning line when the concrete example 2 is ideally embodied. The curve in a scanning line is equal to about 60 μm at its maximum, but no practical problem is caused with respect to such a curve.

Figure 13A:
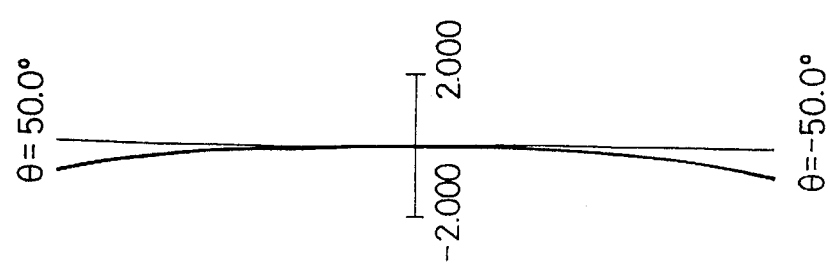
FIG. 13a is a diagram showing a curve in a scanning line caused by an error in an optical arrangement in concrete example 2 before this curve is corrected.
Figure 13B:
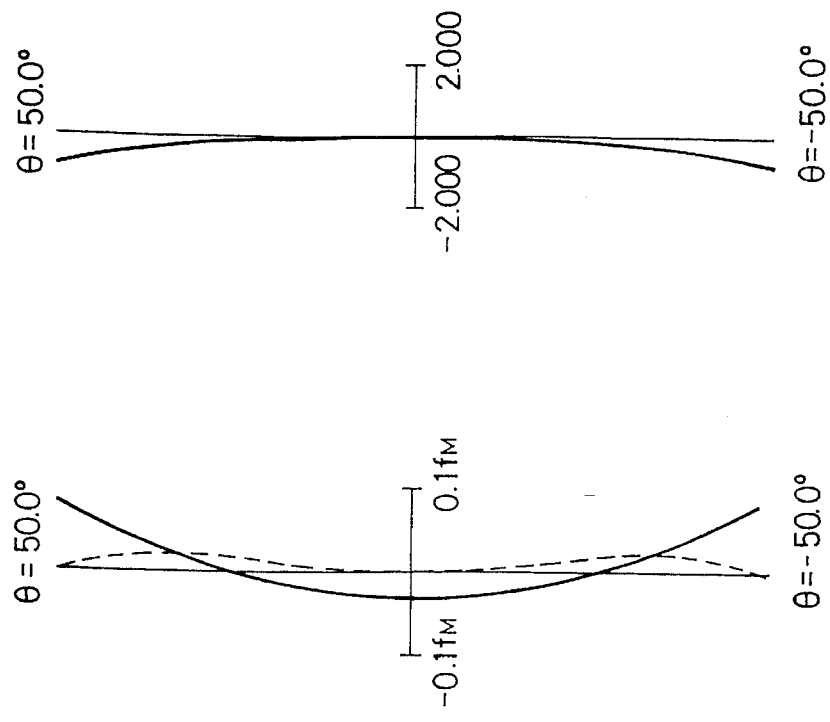
FIG. 13b is a diagram showing a curve in a scanning line caused by an error in an optical arrangement in concrete example 2 after this curve is corrected.

In the concrete example 2, the curve in a scanning line caused by an error in an optical arrangement of the image forming reflecting mirror 6 is shown in FIG. 13a when the image forming reflecting mirror 6 is shifted by +1.1 mm upward in a direction perpendicular to the plane BS. In FIG. 13a, a curving amount of the scanning line is equal to 170 μm at its maximum when a maximum angle θ of deflection is set to ±45 degrees. When a cylindrical lens 3 is displaced by +0.42 mm in this state in a cross scan-corresponding direction to correct the curve in the scanning line, the corrected scanning line is provided as shown in FIG. 13b. In FIG. 13b, a maximum curving amount of the corrected scanning line is equal to 73 μm so that no practical problem is caused with respect to such a curving amount. At this time, a shifting amount $dh_1$ between an ideal scanning line and the uncorrected scanning line shown in FIG. 13a in a cross scanning direction is equal to 1.600 mm. Further, a shifting amount $dh_1$, between the ideal scanning line and the corrected scanning line shown in FIG. 13b in the cross scanning direction is equal to 0.512 min.

An optical arrangement similar to that in the above concrete example 1 is used in the following concrete example 3. Similar to the concrete example 1, a light beam incident to the image forming reflecting mirror 6 is set to a divergent light beam in the main scan-corresponding direction.

CONCRETE EXAMPLE 3

Figure 14A:
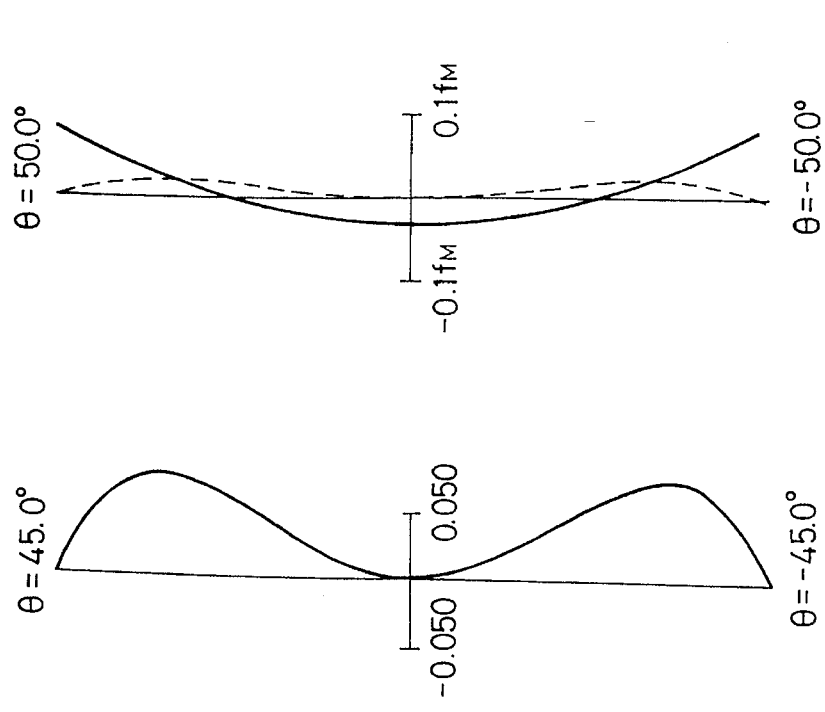
FIGS. 14a and 14b are diagrams respectively showing field curvature and scanning characteristics of the optical scanner when concrete example 3 is ideally embodied, and showing designed values of the field curvature and the scanning characteristics.
Figure 14B:
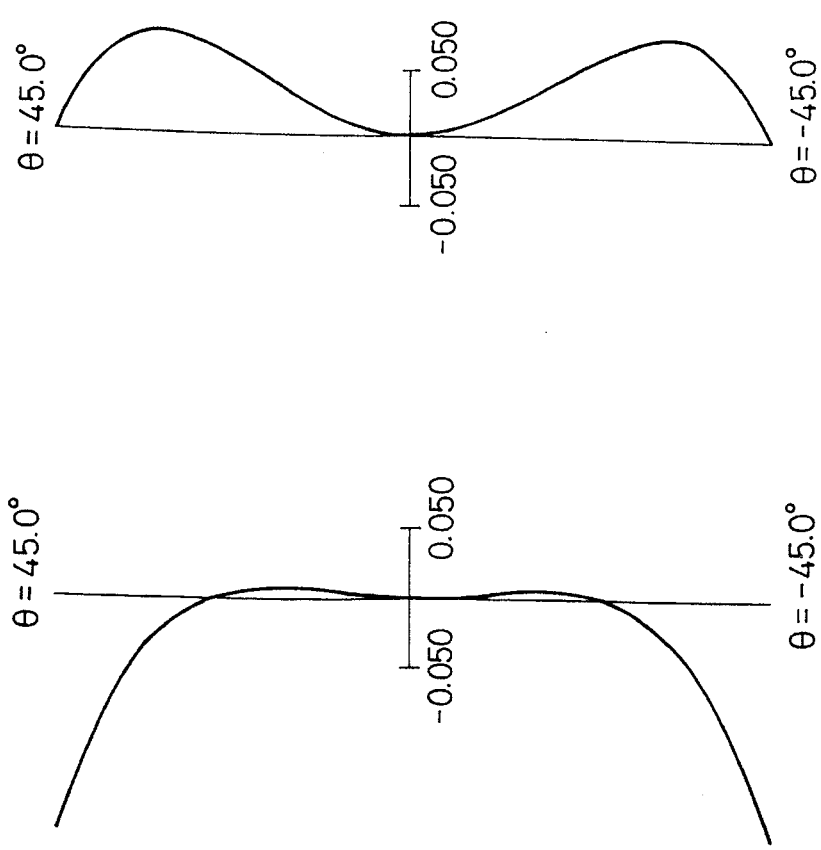

$R_{1M} = \infty$   $R_{1S} = 21.922$   $d_2 = 4.090$   $n = 1.51118$ $R_{2M} = \infty$   $R_{2S} = \infty$   $d_3 = 41.197$ $S_0 = -1959.1$   $d_0 = 61.350$ $Rm = -200$   $Rs = -78.282$   $d_1 = -105.379$ $K = -0.9$ FIGS. 14a and 14b respectively show field curvature and scanning characteristics of the optical scanner when the concrete example 3 is ideally embodied. In the concrete example 3, a curve in a scanning line is shown in FIG. 15a when the image forming reflecting mirror 6 is shifted by +0.2 mm upward in a direction perpendicular to the plane BS. In FIG. 15a, a curving amount of the scanning line is equal to 74 μm at its maximum when a maximum angle θ of deflection is set to ±50 degrees. When the cylindrical lens 3 is displaced by +0.43 mm in this state in a cross scan-corresponding direction to correct the curve in the scanning line, the corrected scanning line is provided as shown in FIG. 15b. In FIG. 15b, a maximum curving amount of the corrected scanning line is equal to 9 μm so that no practical problem is caused with respect to such a curving amount. At this time, a shifting amount $dh_1$ between an ideal scanning line and the uncorrected scanning line shown in FIG. 15a in a cross scanning direction is equal to 0.538 mm. Further, a shifting amount $dh_1$, between the ideal scanning line and the corrected scanning line shown in FIG. 15b in the cross scanning direction is equal to −0.191 mm.

An optical arrangement similar to that in the above concrete example 1 is used in the following concrete example 4. In this concrete example 4, a light beam emitted from a coupling lens 2 is set to a parallel light beam.

CONCRETE EXAMPLE 4

Figure 17A:
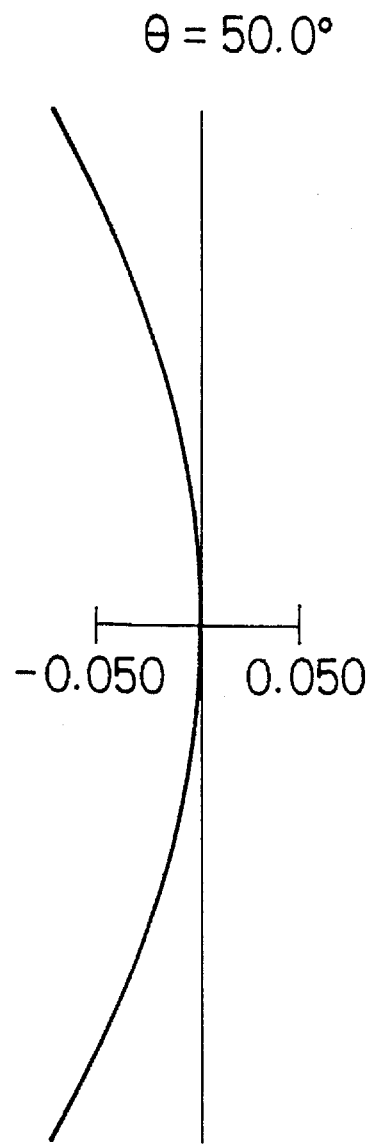
FIG. 17a is a diagram showing a curve in a scanning line caused by an error in an optical arrangement in the concrete example 4 before this curve is corrected.
Figure 17B:
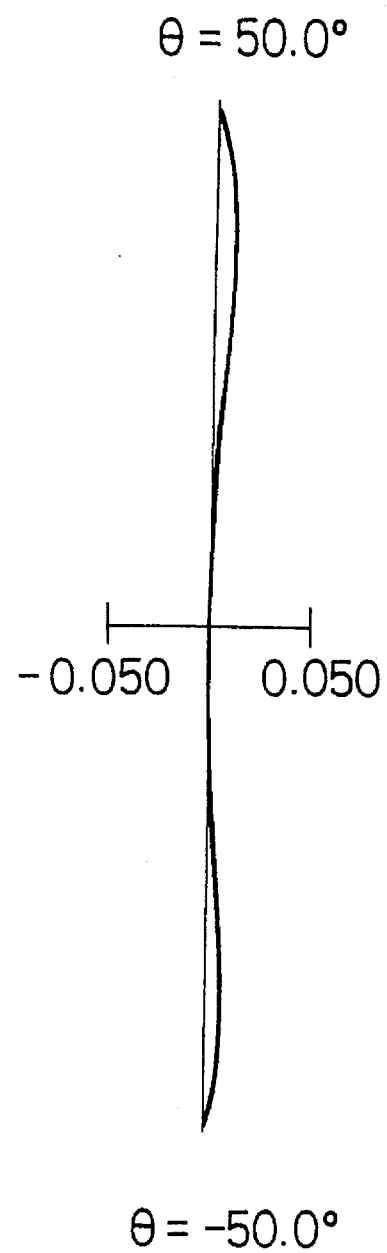
FIG. 17b is a diagram showing a curve in a scanning line caused by an error in an optical arrangement in the concrete example 4 after this curve is corrected.

$R_{1M} = \infty$   $R_{1S} = 21.278$   $d_2 = 3.970$   $n = 1.51118$ $R_{2M} = \infty$   $R_{2S} = \infty$   $d_3 = 38.984$ $S_0 = \infty$   $d_0 = 63.517$ $Rm = -200$   $Rs = -77.888$   $d_1 = -100.126$ $K = -0.5$ FIGS. 16a and 16b respectively show field curvature and scanning characteristics of the optical scanner when the concrete example 4 is ideally embodied. In the concrete example 4, a curve in a scanning line is shown in FIG. 17a when the image forming reflecting mirror 6 is shifted by +0.2 mm upward in a direction perpendicular to the plane BS. In FIG. 17a, a curving amount of the scanning line is equal to 73 μm at its maximum when a maximum angle θ of deflection is set to ±50 degrees. When the cylindrical lens 3 is displaced by +0.42 mm in this state in a cross scan-corresponding direction to correct the curve in the scanning line, the corrected scanning line is provided as shown in FIG. 17b. In FIG. 17b, a maximum curving amount of the corrected scanning line is equal to 9 μm so that no practical problem is caused with respect to such a curving amount. At this time, a shifting amount $dh_1$ between an ideal scanning line and the uncorrected scanning line shown in FIG. 17a in a cross scanning direction is equal to 0.514 mm. Further, a shifting amount $dh_1$, between the ideal scanning line and the corrected scanning line shown in FIG. 17b in the cross scanning direction is equal to −0.141 mm.

Figure 18:
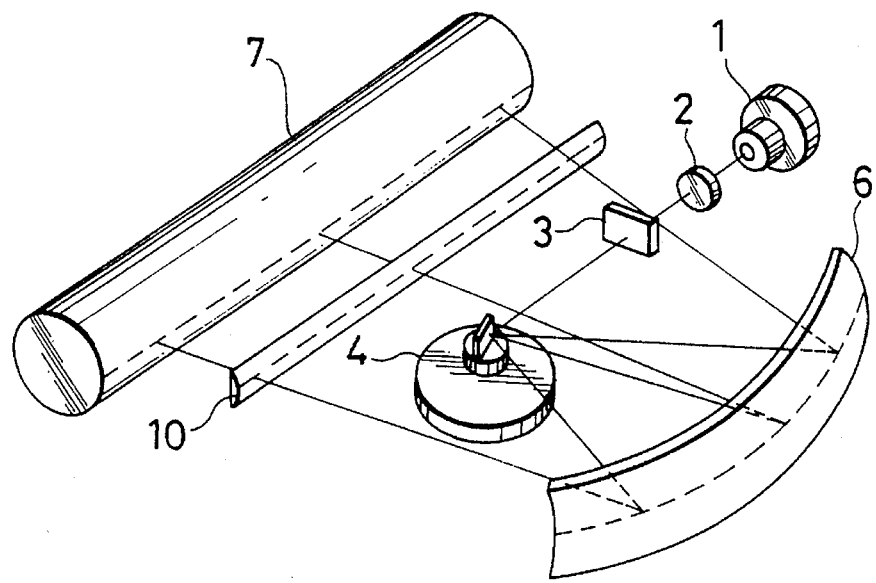
FIG. 18 is a view for explaining an optical scanner in accordance with another embodiment of the present invention.

FIG. 18 shows an optical scanner in accordance with another embodiment of the present invention. For brevity, constructional portions similar to those in FIG. 1 are designated by the same reference numerals as FIG. 1.

In this embodiment, the reflecting face of an image forming reflecting mirror 6 is constructed by a coaxial aspherical surface. The image forming reflecting mirror 6 is symmetrical with respect to an optical axis thereof. Therefore, an elongated cylindrical lens 10 is arranged in the vicinity of a scanned face to correct field curvature in a cross scanning direction and correct the inclination of a deflecting reflecting face.

Figure 19:
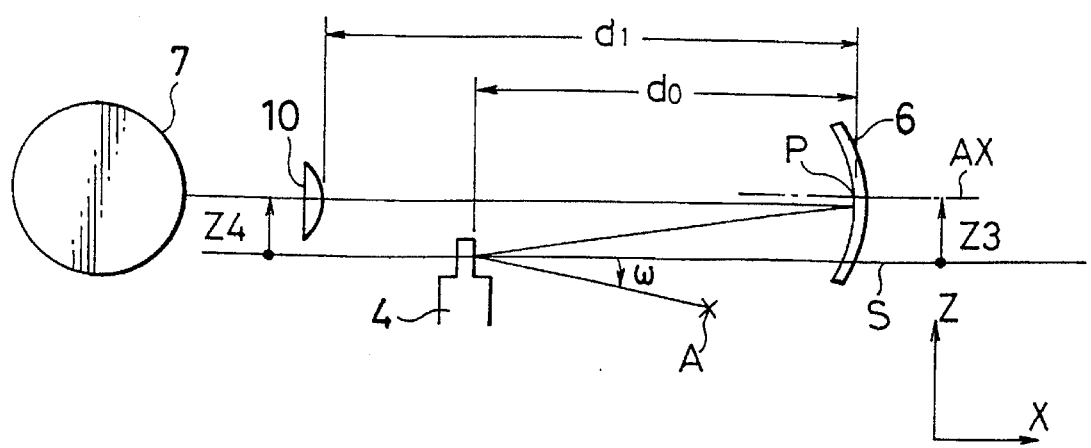
FIG. 19 is a view for explaining separation of optical paths in the embodiment shown in FIG. 18.

The optical path of a deflected light beam incident to the image forming reflecting mirror 6 is separated from an optical path of the deflected light beam reflected on the image forming reflecting mirror 6. To separate these optical paths from each other, as shown in FIG. 19, a light beam from the side of a light source shown by reference numeral A is incident to a deflecting reflecting face of an optical deflector 4 such that this light beam is inclined with respect to a rotational axis of the deflecting reflecting face. The deflected light beam is incident to the image forming reflecting mirror 6 such that the deflected light beam is inclined with respect to a symmetrical face including an optical axis AX of the image forming reflecting mirror 6 and parallel to a main scan-corresponding direction. Reference numeral S designates a plane passing an incident position of the light beam incident to the deflecting reflecting face and perpendicular to the rotational axis of the optical deflector 4. Reference numeral ω designates an angle of inclination of the light beam incident to the deflecting reflecting face with respect to the plane S. As shown in FIG. 19, reference numerals Z3 and Z4 respectively designate heights of the optical axis AX of the image forming reflecting mirror 6 and an elongated cylindrical lens 10 from the plane S. Distances $d_0$ and $d_1$ are set as shown in FIG. 19. $R_{3M}$ and $R_{3S}$ are respectively set to radii of curvature of an incident side face of the cylindrical lens 10 with respect to main and cross scanning directions. $R_{4M}$ and $R_{4S}$ are respectively set to radii of curvature of a light emitting side face of the cylindrical lens 10 with respect to the main and cross scanning directions. Reference numeral n' designates a refractive index of the cylindrical lens 10. $d_2'$ designates a thickness of the cylindrical lens 10. $d_3'$ designates a distance between the cylindrical lens 10 and a scanned face.

CONCRETE EXAMPLE 5

$R_{1M} = \infty$   $R_{1S} = 50.119$   $d_2 = 9.351$   $n = 1.51118$
$R_{2M} = \infty$   $R_{2S} = \infty$   $d_3 = 123.894$
$S_0 = -135.476$        $d_0 = 54.981$
                $d_1 = -354.01$ $Rm = -200$   $Rs = -200$   $K = -3.0$ -continued $R_{3M} = \infty$   $R_{3S} = -26.1811$   $d_2' = 5.61$   $n' = 1.51118$
$R_{4M} = \infty$   $R_{4S} = \infty$   $d_3' = -52.363$ $\omega = 4.0°$   $Z3 = -0.855$   $Z4 = 14.592$ Since $S_0$ is a negative value, the light beam incident to the image forming reflecting mirror 6 is a divergent light beam in the main scan-corresponding direction.

FIGS. 20a, 20b and 20c respectively show field curvature, scanning characteristics and a curve in a scanning line when the concrete example 5 is ideally embodied. The curve in a scanning line is equal to about 44 μm at its maximum, but no practical problem about such a curve is caused.

In FIG. 19, the curve in a scanning line caused by an error in an optical arrangement of the image forming reflecting mirror 6 is shown in FIG. 21a when the image forming reflecting mirror 6 is inclined 0.2 degrees in the counter-clockwise direction around an axis passing a point P and perpendicular to a paper face. In FIG. 21a, a curving amount of the scanning line is equal to 126 μm at its maximum when a maximum angle θ of deflection is set to ±48.6 degrees.

When a cylindrical lens 3 is moved by +1.1 mm in this state in a cross scan-corresponding direction to correct the curve in the scanning line, the corrected scanning line is provided as shown in FIG. 21b. In FIG. 21b, a maximum curving amount of the corrected scanning line is equal to 69 μm so that an optical scanning operation can be performed without any practical problem with respect to such a curving amount.

An optical arrangement similar to that in the above concrete example 5 is used in the following concrete example 6. In this concrete example 6, a light beam incident to the image forming reflecting mirror 6 is set to a convergent light beam in the main scan-corresponding direction.

CONCRETE EXAMPLE 6

$R_{1M} = \infty$   $R_{1S} = 14.766$   $d_2 = 2.755$   $n = 1.51118$
$R_{2M} = \infty$   $R_{2S} = \infty$   $d_3 = 21.477$
$S_0 = 38.517$        $d_0 = 57.776$
                $d_1 = -16.529$ $Rm = -200$   $Rs = -200$   $K = 4.0$ $R_{3M} = \infty$   $R_{3S} = -6.667$   $d_2' = 1.653$   $n' = 1.51118$
$R_{4M} = \infty$   $R_{4S} = \infty$   $d_3' = -10.705$ $\omega = -6.0°$   $Z3 = -24.419$   $Z4 = -10.094$ FIGS. 22a, 22b and 22c respectively show field curvature, scanning characteristics and a curve in a scanning line when the concrete example 6 is ideally embodied. The curve in a scanning line is equal to about 82 μm at its maximum.

In FIG. 19, the curve in a scanning line caused by an error in an optical arrangement of the image forming reflecting mirror 6 is shown in FIG. 23a when the image forming reflecting mirror 6 is shifted by +2.0 mm upward in a cross scan-corresponding direction. In FIG. 23a, a curving amount of the scanning line is equal to 104 μm at its maximum when a maximum angle θ of deflection is set to ±49.6 degrees.

When the cylindrical lens 3 is moved by −0.4 mm in this state in the cross scan-corresponding direction to correct the curve in the scanning line, the corrected scanning line is provided as shown in FIG. 23b. In FIG. 23b, a maximum curving amount of the corrected scanning line is equal to 52

μm so that an optical scanning operation can be performed without any practical problem with respect to such a curving amount.

Figure 24:
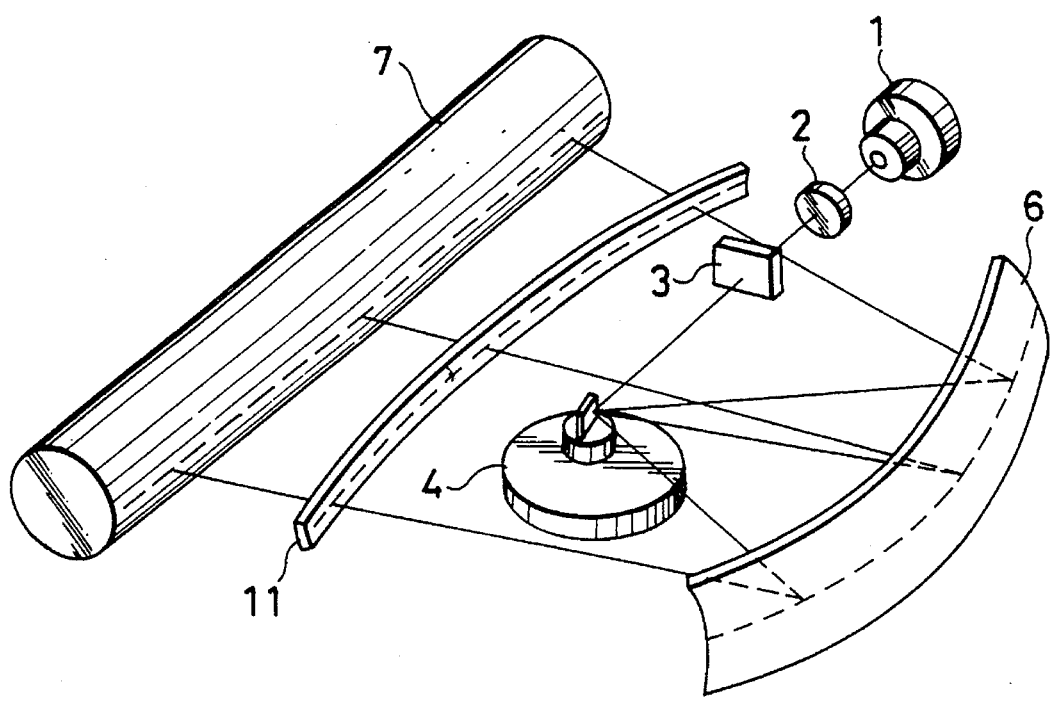
FIG. 24 is a view for explaining an optical scanner in accordance with another embodiment of the present invention.

FIG. 24 shows an optical scanner in accordance with another embodiment of the present invention. For brevity, constructional portions similar to those in FIG. 1 are designated by the same reference numerals as FIG. 1.

In this embodiment, the reflecting face of an image forming reflecting mirror 6 is constructed by a coaxial aspherical surface. The image forming reflecting mirror 6 is symmetrical with respect to an optical axis thereof. Therefore, an elongated toroidal lens 11 is arranged in the vicinity of a scanned face to correct field curvature in a cross scanning direction and correct the inclination of a deflecting reflecting face. An incident side lens face of this elongated toroidal lens 11 is constructed by a barrel-type toric face as explained with reference to FIG. 4. A light-emitting side lens face of the elongated toroidal lens 11 is constructed by a normal toric face.

In the following concrete example 7, the optical path separating system shown in FIG. 2c is used as a system for separating optical paths from each other in the optical scanner shown in FIG. 24. Accordingly, if the optical scanner is ideally arranged optically in this case, no curve in a scanning line is caused.

Distances $d_0$ and $d_1$ are similar to those in FIG. 19. $R_{3m}$ and $R_{3s}$ are respectively set to radii of curvature of an incident side face of the toroidal lens 11 with respect to main and cross scanning directions. $R_{4m}$ and $R_{4s}$ are respectively set to radii of curvature of a light-emitting side face of the toroidal lens 11 with respect to the main and cross scanning directions. Reference numeral n' designates a refractive index of the toroidal lens 11. $d_2'$ designates a thickness of the toroidal lens 11. $d_3'$ designates a distance between the toroidal lens 11 and a scanned face.

CONCRETE EXAMPLE 7

$R_{1M} = \infty$   $R_{1S} = 21.277$   $d_2 = 2.128$   $n = 1.51118$ $R_{2M} = \infty$   $R_{2S} = \infty$   $d_3 = 43.761$ $S_0 = \infty$   $d_0 = 69.504$ $d_1 = -78.014$ $Rm = -200$   $Rs = -200$   $K = -0.3$ $R_{3m} = 496.454$   $R_{3s} = 18.085$   $d_2' = -2.128$ $n' = 1.57210$ $R_{4m} = 496.454$   $R_{4s} = 6.950$   $d_3' = -19.858$ Since $S_0$ is an infinite value ($\infty$), a light beam incident to a cylindrical lens 3 through a coupling lens 2 is set to a parallel light beam.

FIGS. 25a and 25b respectively show field curvature and scanning characteristics of the optical scanner when the concrete example 7 is ideally embodied. In the concrete example 7, a curve in a scanning line caused by an error in an optical arrangement of the image forming reflecting mirror 6 is shown in FIG. 26a when the image forming reflecting mirror 6 is shifted by +0.3 mm upward in a direction perpendicular to a plane BS and the elongated toroidal lens 11 is shifted by 1.0 mm in the same direction as the image forming reflecting mirror 6. This plane BS is formed by performing a scanning operation using a principal ray of a light beam deflected by an optical deflector. In FIG. 26a, a curving amount of the scanning line is equal to 41 μm at its maximum when a maximum angle θ of deflection is set to ±45 degrees. When the cylindrical lens 3 is displaced by +0.3 mm in this state in a cross scan-corresponding direction to correct the curve in the scanning line, the corrected scanning line is provided as shown in FIG. 26b. In FIG. 26b, a maximum curving amount of the corrected scanning line is equal to 1 μm so that no practical problem is caused with respect to such a curving amount. At this time, a shifting amount $dh_1$ between an ideal scanning line and the uncorrected scanning line shown in FIG. 25a in a cross scanning direction is equal to 1.089 mm. Further, a shifting amount $dh_1$, between the ideal scanning line and the corrected scanning line shown in FIG. 26b in the cross scanning direction is equal to 1.043 mm.

Figure 27:
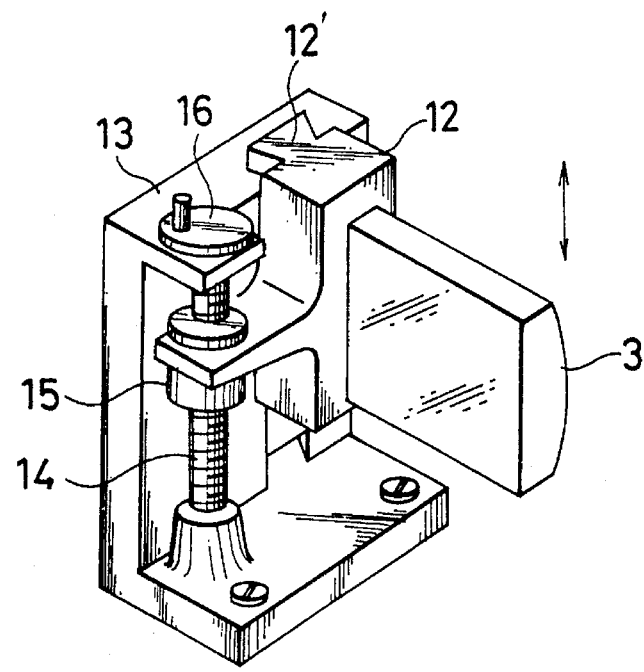
FIG. 27 is a perspective view showing one concrete example of an adjusting mechanism.

FIG. 27 shows one example of a mechanism for adjusting a displacing amount of the cylindrical lens in the cross scan-corresponding direction. A moving frame 12 fixedly holds the cylindrical lens 3 and is slidably engaged with a groove 12' of a base 13. A nut portion 15 is integrated with the moving frame 12 and is screwed onto a feed screw 11 attached to the base 13. Accordingly, the cylindrical lens 3 can be displaced in the cross scan-corresponding direction by rotating the feed screw 14 by using a thumbscrew 16 for rotation.

In each of the above-mentioned embodiments, an error in an optical arrangement is constructed by an error in arrangement of the image forming reflecting mirror as one example. In reality, errors in arrangement of all optical elements are caused and are accumulated in a complicated form. Accordingly, the curving amount of a scanning line is actually large in comparison with that in each of the above embodiments and a curving shape of the scanning line is complicated in comparison with that in each of the above embodiments. However, in such a case, the curve in the scanning line can be effectively corrected and reduced by displacing a linear image forming optical system the cylindrical lens 3, etc. in a cross scan-corresponding direction.

As mentioned above, in accordance with a first structure of a novel optical scanner in the present invention, it is possible to simply correct and reduce a curve in a scanning line caused by errors in manufacture and assembly of an optical system. In accordance with a second structure of the present invention, the curve in a scanning line can be corrected and an optical scanning operation can be preferably performed at an equal speed. In accordance with a third structure of the present invention, the curve in a scanning line can be corrected and the inclination of a deflecting reflecting face of an optical deflector can be corrected so that it is possible to prevent jitter from being caused. In accordance with a fourth structure of the present invention, it is not necessary to dispose an elongated cylindrical lens, etc. so as to correct field curvature in a cross scanning direction and correct the inclination of the deflecting reflecting face, thereby simplifying the optical scanner.

In accordance with a fifth structure of the present invention, the curve in a scanning line can be corrected and the position of a corrected scanning line can be set to be in conformity with a designed position of the scanning line. In accordance with a sixth structure of the present invention, a distance between the deflecting reflecting face and an image forming mirror system (an image forming reflecting mirror) can be set to be short so that the optical scanner can be made compact. In accordance with a seventh structure of the present invention, the distance between the deflecting reflecting face and the image forming mirror system is conversely large so that a layout of the optical system is easily made and the optical system is easily arranged. In accordance with an eighth structure of the present invention, a distance between a light source device and a linear image forming optical system can be freely set so that a layout of the optical scanner can be easily made.

Figure 28A:
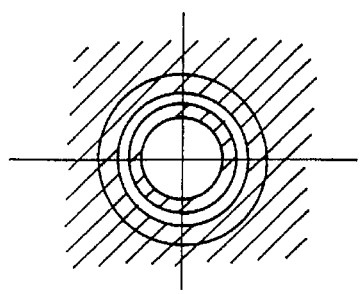
FIGS. 28a and 28b are views for explaining a light spot.
Figure 28B:
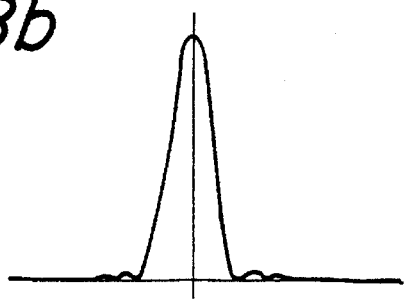
Figure 29A:
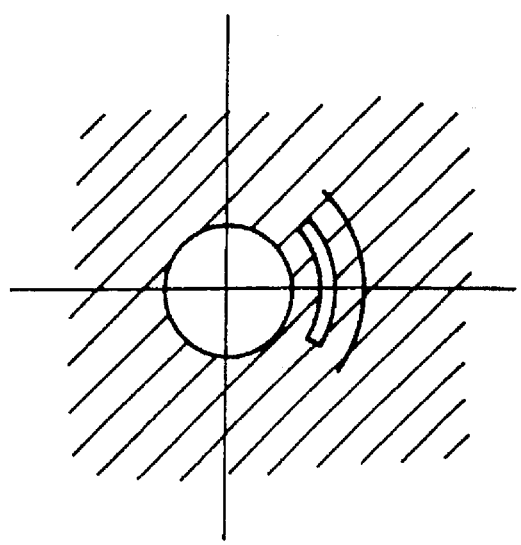
FIGS. 29a and 29b are views for explaining a light spot deformed or deteriorated by an error in an optical arrangement.
Figure 29B:
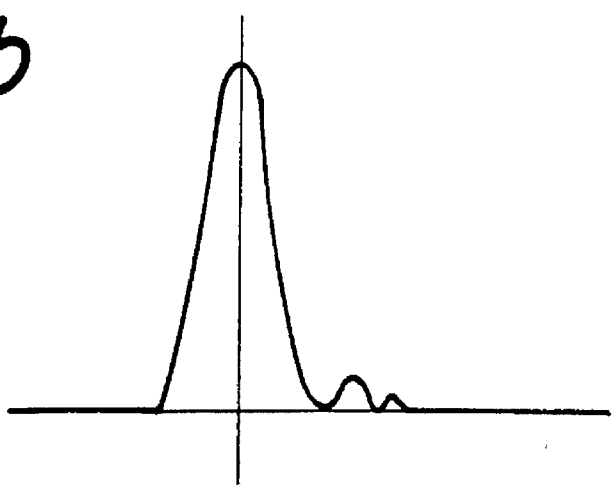

Errors in arranging accuracy of optical elements have influences upon the above curve in a scanning line and a light intensity distribution of a light spot formed on a scanned face. For example, a light spot is formed on the scanned face as shown in FIGS. 28a and 28b in an optical scanner assembled as designed. FIG. 28a shows an image of the light spot and FIG. 28b shows a light intensity distribution of the light spot. In this case, when there are large errors in arrangement of optical elements, no light intensity distribution of the light spot is symmetrical with respect to a center of the light spot as shown in FIGS. 29a and 29b. FIG. 29a shows an image of the light spot and FIG. 29b shows the light intensity distribution of the light spot. Such deformation or deterioration of the light spot causes a reduction in quality of an image recorded by an optical scanning operation. A deforming or deteriorating amount of the light spot can be effectively reduced by an adjusting method for displacing the linear image forming optical system in a cross scan-corresponding direction.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:

a light source device for emitting a light beam for performing an optical scanning operation;

a linear image forming optical system for forming the light beam from the light source device as a linear image extending in a main scan-corresponding direction;

an optical deflector for reflecting the light beam from this linear image forming optical system on a deflecting reflecting face and deflecting the reflected light beam at an equal angular velocity;

a light spot image forming optical system for guiding the deflecting light beam onto a scanned face and converging the deflecting light beam as a light spot on the scanned face; and adjusting means for adjusting said linear image forming optical system in a cross scan-corresponding direction to correct a curvature in a scanning line formed on the scanned face;

wherein said light spot image forming optical system includes an image forming reflecting mirror for converging the deflecting light beam onto the scanned face by said light spot image forming optical system in at least the main scan-corresponding direction and having a function for performing the optical scanning operation at an equal speed.

2. An optical scanner as claimed in claim 1, wherein the image forming reflecting mirror has an aspherical reflecting face.

3. An optical scanner as claimed in claim 1, wherein the linear image forming optical system is positioned such that the linear image extending in the main scan-corresponding direction is formed in the vicinity of the deflecting reflecting face of the optical deflector; and said image forming reflecting mirror is constructed such that the light spot image forming optical system approximately sets positions of the deflecting reflecting face in a conjugate relation in geometrical optics with respect to the cross scan-corresponding direction.

4. An optical scanner as claimed in claim 1, wherein the image forming reflecting mirror is constructed by an anamorphic concave mirror having different image forming functions in the main scan-corresponding direction and the cross scan-corresponding direction; and the deflected light beam is converged as a light spot on the scanned face by only the image forming reflecting mirror.

5. An optical scanner as claimed in claim 1, wherein the light spot image forming optical system has a reflecting mirror rotatable around an axis parallel to the main scan-corresponding direction.

6. An optical scanner as claimed in any one of claims 1 to 5, wherein the light beam incident to the image forming reflecting mirror from said light source device through said linear image forming optical system is convergent in the main scan-corresponding direction.

7. An optical scanner as claimed in any one of claims 1 to 5, wherein the light beam incident to the image forming reflecting mirror from said light source device through said linear image forming optical system is divergent in the main scan-corresponding direction.

8. An optical scanner as claimed in any one of claims 1 to 5, wherein the light beam emitted from the light source device is a parallel light beam.

9. An optical scanner as claimed in any one of claims 1 to 5, wherein the optical deflector is constructed by a rotary polygon mirror, a pyramidal mirror or a rotary unifacial mirror.

* * * * *